United States Patent
Hiromatsu et al.

(10) Patent No.: US 7,804,622 B2
(45) Date of Patent: Sep. 28, 2010

(54) IMAGE READING APPARATUS

(75) Inventors: Kenji Hiromatsu, Chiba (JP); Noriaki Matsui, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 268 days.

(21) Appl. No.: 12/190,927

(22) Filed: Aug. 13, 2008

(65) Prior Publication Data
US 2008/0316544 A1 Dec. 25, 2008

(30) Foreign Application Priority Data

Feb. 19, 2003 (JP) ............... 2003-041203
Jun. 25, 2003 (JP) ............... 2003-180673

(51) Int. Cl.
G06K 15/00 (2006.01)
G06K 9/00 (2006.01)
H04N 1/46 (2006.01)

(52) U.S. Cl. ............... 358/1.9; 358/3.24; 358/505; 382/167

(58) Field of Classification Search ............... 358/1.9, 358/505, 509, 516, 530, 538, 474, 486, 496, 358/498, 3.24; 382/162, 167, 315, 318; 702/111; 355/84
See application file for complete search history.

(56) References Cited

U.S. PATENT DOCUMENTS 7,170,643 B2 * 1/2007 Matsui et al. ............... 358/3.26
2005/0157351 A1 * 7/2005 Matsuda ..................... 358/474
2009/0153917 A1 * 6/2009 Shiraishi .................... 358/474

FOREIGN PATENT DOCUMENTS

JP 2001-157052 6/2001
JP 2001-201804 7/2001
JP 2002-44438 2/2002

* cited by examiner

Primary Examiner—Madeleine A Nguyen
(74) Attorney, Agent, or Firm—Fitzpatrick, Cella, Harper & Scinto

(57) ABSTRACT

Disclosed is an image reading apparatus including: an original transporting device for transporting an original; an image reader for reading an image of the original in a first reading region or a second reading region while transporting the original by the original transporting device; and a correcting device for correcting image data read in the second reading region by the image reader so as to give the image data the same white level as image data read in the first reading region based on the ratio of the white level of the second reading region to that of the first reading region.

14 Claims, 18 Drawing Sheets

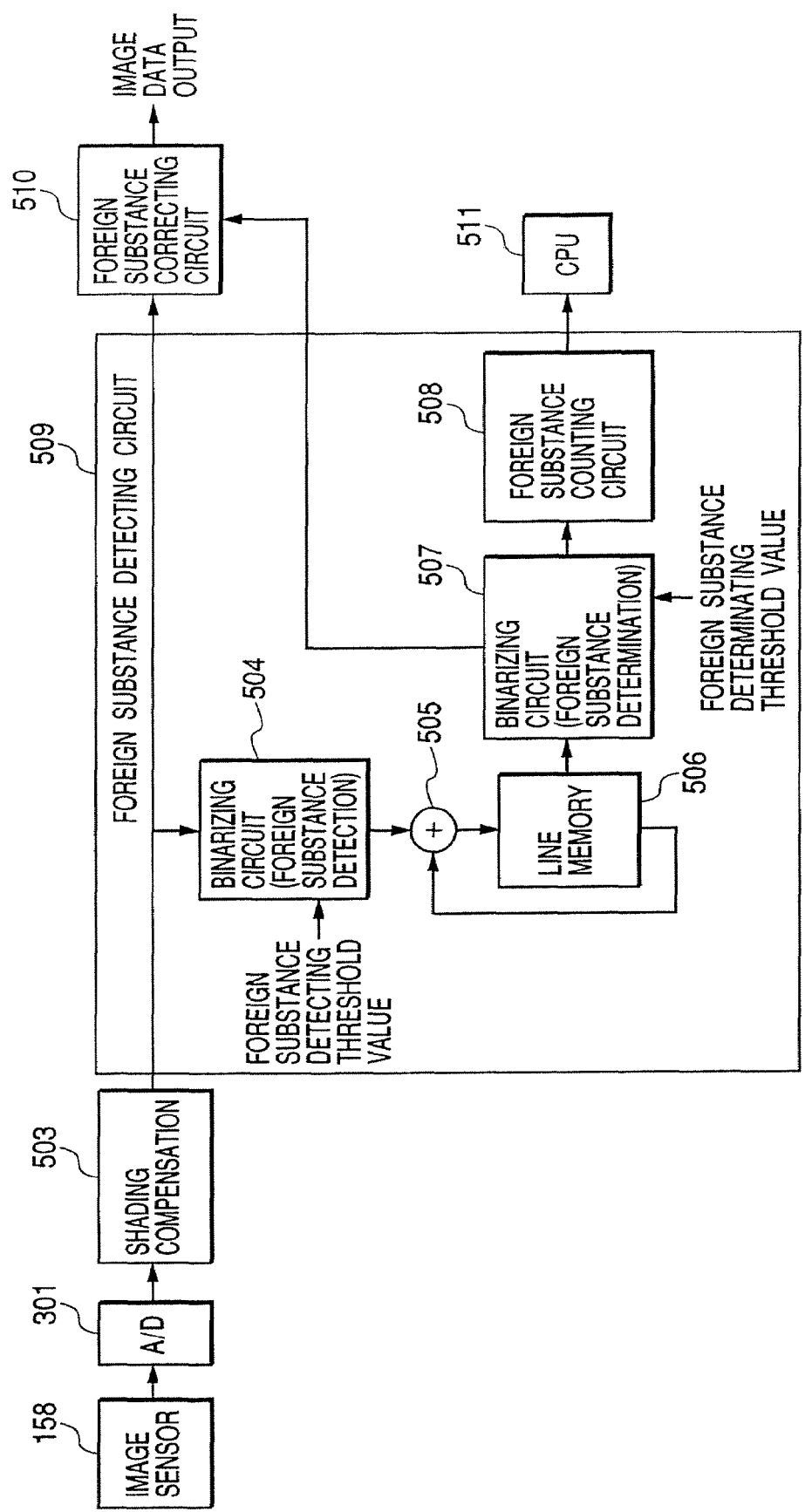

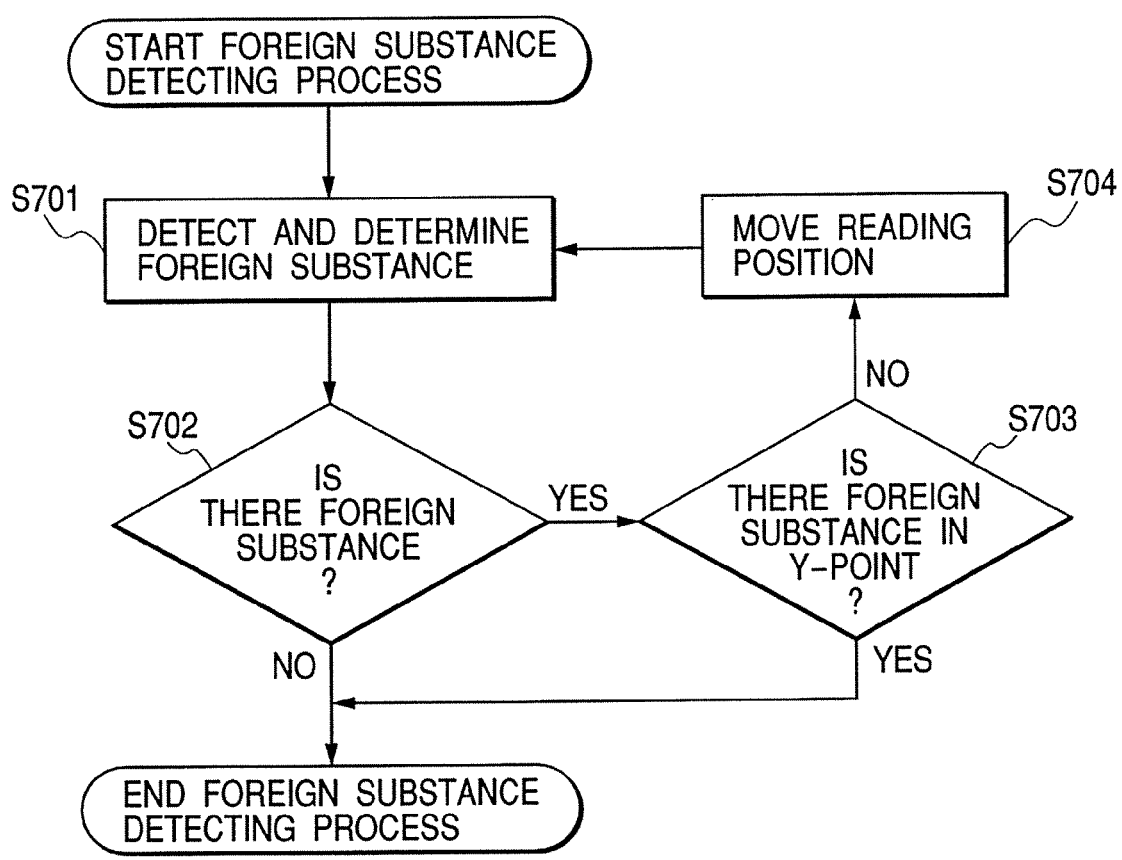

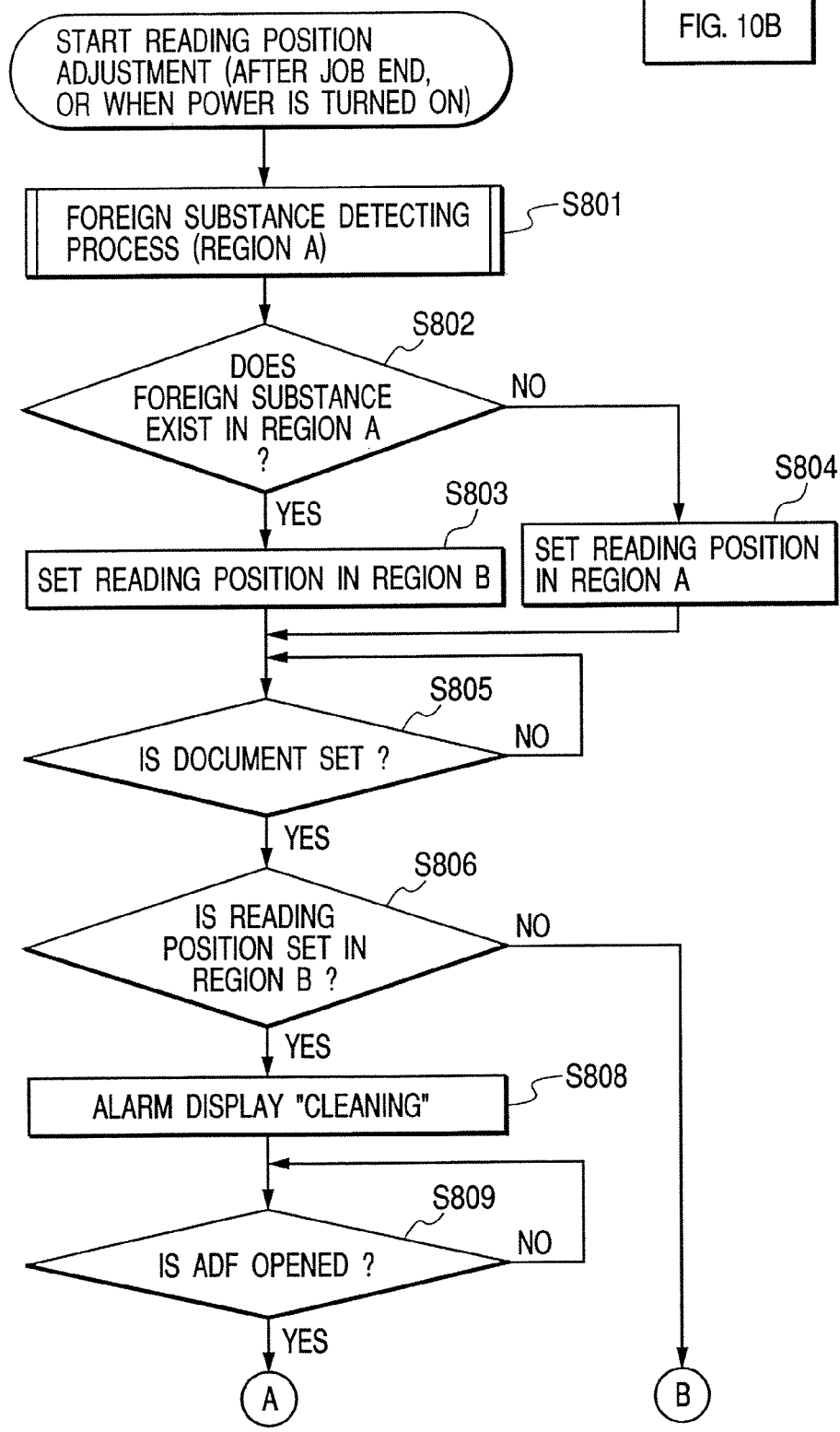

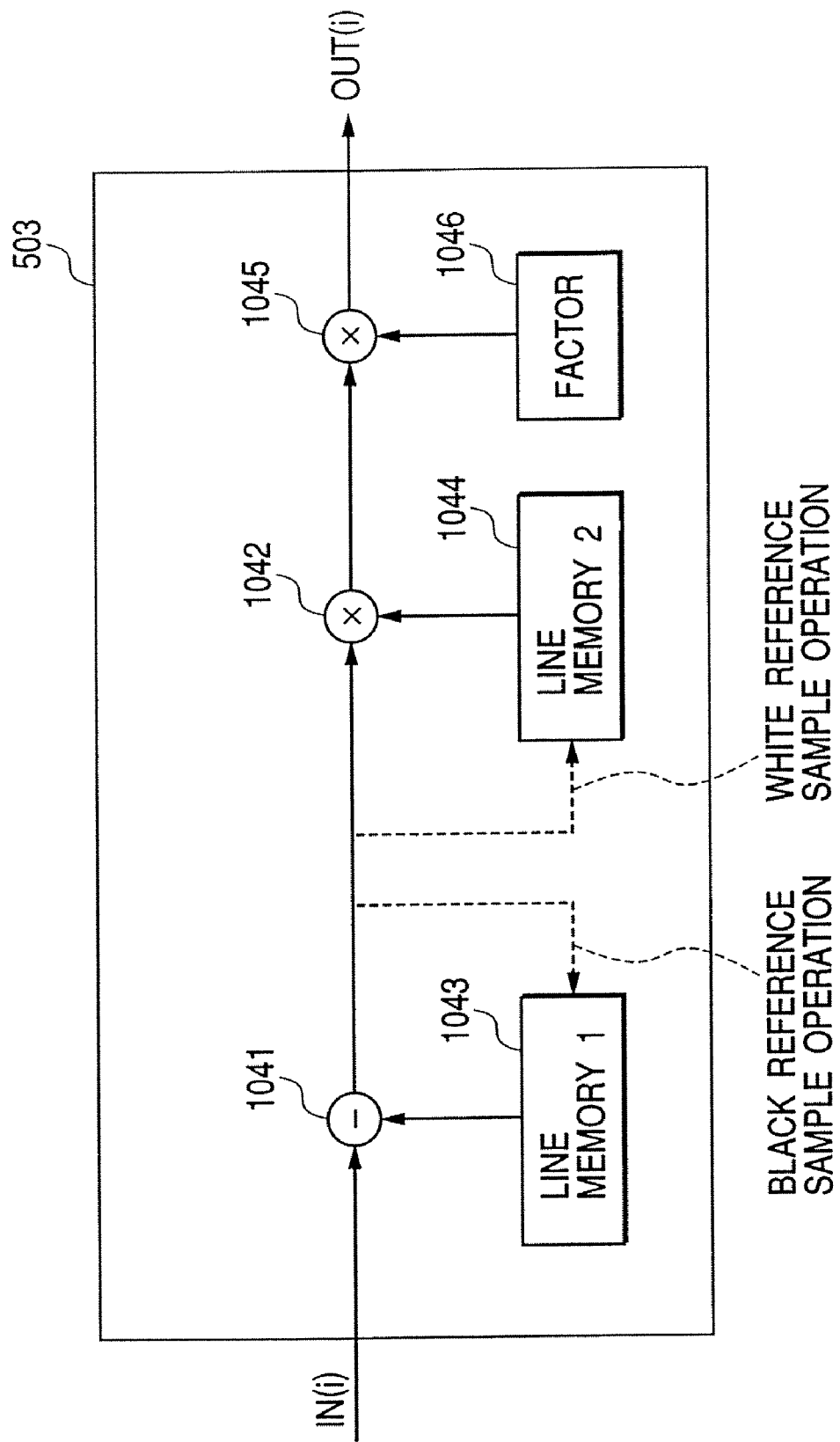

IMAGE READING APPARATUS

RELATED APPLICATIONS

This application is a continuation of U.S. patent application Ser. No. 10/778,247, filed Feb. 17, 2004 (now allowed) now U.S. Pat. No. 7,450,279, which are incorporated by reference herein in their entirety, as if fully set forth herein, and claim the benefit of priority under 35 U.S.C. §119, based on Japanese Priority Application No. JP 2003-041203, filed Feb. 19, 2003 and Japanese Priority Application No. JP 2003-180673, filed Jun. 25, 2003, which is incorporated by reference herein in its entirety, as if fully set forth herein.

BACKGROUND OF THE INVENTION

1. Field of the Invention

The present invention relates to an image reading apparatus for reading an image on a sheet material (original), such as a scanner, a copying machine, a printer, or a facsimile apparatus.

2. Related Background Art

In a conventional image reading apparatus provided in a digital copying machine, a printer, a facsimile apparatus or the like, an original treatment apparatus (ADF: Auto Document Feeder), which is an example of an automatic sheet feeding apparatus for automatically feeding an original in the form of a sheet to the image reading apparatus, is provided so as to allow opening and closing.

One of the reading methods for an image reading apparatus equipped with such an original treatment apparatus is a reading method in which the reading device, which is provided below the original treatment apparatus, is moved to stop at a pre-set position by a motor, light is emitted from a lamp unit onto an original that is automatically fed by the original treatment apparatus and transported at a predetermined speed, to perform scanning thereon, and the reading device detects the reflected light to thereby read the image (Hereinafter, this method will be referred to as flow reading).

FIG. 13 shows the construction of the portion in the vicinity of a reading position of a conventional original treatment apparatus adopting flow reading. In the construction shown in FIG. 13, transport roller pairs (402 and 403) are respectively arranged on the upstream side and the downstream side of the reading position α, and, substantially above the reading position α, there are provided a platen glass plate 404 and a guide member 405 spaced apart therefrom by a predetermined gap. A reading device 401 is moved to the reading position α, and the original P is transported past the reading position α at a fixed speed while being regulated by the gap, whereby the reading of the image is effected while restraining fluctuations in speed during the transport of the original. In this case, the reading position α is provided on the upstream side with respect to the position where the original P is in contact with the platen glass plate 404, and the original P is kept somewhat raised from the platen glass plate 404 while the reading is conducted.

Further, FIG. 14 shows a construction in which, instead of the guide member 405, there is provided a platen roller 406 that can be rotated by a driving means (not shown), with the original being transported while pressed against the platen glass plate 404 with a smaller gap therebetween than in the case of the guide member 405. The platen roller 406 is used as a means for preventing the original P from rising when the reading depth is small as in the case of a contact image sensor (CIS) and the like. In this case, the reading position β is a position which is in the vicinity of the platen roller 406 and at which the original P is in contact with the platen glass plate 404.

The conventional original treatment apparatuses adopting flow reading have the following problems. In the construction of FIG. 13, reading is effected at a position where the original P is not in contact with the platen glass plate 404, so that foreign substance (airborne foreign substance) generated during original transport, such as toner dust, paper dust, and rubber dust, is scattered and allowed to remain on the platen glass plate 404. When allowed to remain at the image reading position, such airborne foreign substance may be read as a black lined image.

In the construction of FIG. 14, the reading position is set at the position where the original P is in contact with the platen glass plate 404, so that foreign substance (adhering foreign substance) on the original P, such as ink, correction fluid, or paste, is easily allowed to adhere by being rubbed against the platen glass plate 404. Thus, when allowed to adhere to the reading position β, such adhering foreign substance may be read as a black lined image.

Thus, in the conventional flow reading method, it is difficult to prevent generation of a black lined image in the output read image due to airborne foreign substance, adhering foreign substance, etc. As a means for coping with this, a control method is known according to which any foreign substance at the reading position is detected, the reading position being changed according to the detection result (see, for example, Japanese Laid-Open Patent Application No. 2000-196814).

However, the above control, in which the reading position is changed based on the foreign substance detection result, involves the following problem. Due to the physical difference between the first reading position (the reading position prior to the change) and the second reading position (the reading position after the change), there is generated a difference in the quantity of illumination light incident on the reading device after being reflected by the original, resulting in a difference in white level in the original. In some cases, this is due to the influence of back reflection light from a white member on the back side of the original, such as a Mylar or a white roller, or due to rising of the original.

Regarding the above difference in white level due to the difference in reading position, it is necessary to effect correction such that the white level at the first reading position becomes the same as that at the second reading position.

SUMMARY OF THE INVENTION

It is an object of the present invention to provide an image reading apparatus which prevents a change in image signal level when changing the reading position, making it possible to read a satisfactory image.

In order to attain the above-mentioned object, according to a first aspect of the present invention, there is provided an image reading apparatus including:

an original transporting means for transporting an original;

an image reading means for reading an image of the original in one of a first reading region and a second reading region while transporting the original by the original transporting means; and a correction means for correcting image data read in the second reading region by the image reading means so as to give the image data the same white level as image data read in the first reading region based on a ratio of the white level of the second reading region to that of the first reading region.

In this construction, it is possible to effect correction such that the white level remains the same if the reading position is changed.

In order to attain the above-mentioned object, according to a second aspect of the present invention, there is provided an image reading apparatus including:

a transport means for transporting a reference sheet;

a reading means for reading at a predetermined reading position while transporting the reference sheet by the transport means;

a changing means for changing the predetermined reading position from a first reading position to a second reading position;

a control means for performing control such that the reference sheet is read at the second reading position after being read at the first reading position according to a predetermined reading mode; and a correction means for preparing a white level correction value based on the ratio of second data read at the second reading position to first data read at the first reading position.

In this construction, it is possible to effect correction such that the white level remains the same if the reading position is changed.

Preferably, in the predetermined reading mode, the reference sheet is read at the second reading position without being discharged after being read at the first reading position.

More preferably, the predetermined reading mode is a duplex mode.

More preferably, the predetermined reading mode is a circulation mode.

More preferably, the first data and the second data are sampling data.

More preferably, as the sampling data, average data of peripheral n pixels is used with respect to m main-scanning pixels, and average data of p lines in a sub scanning direction is used with respect to o sub-scanning lines.

The above and other objects, features, and advantages of the invention will become more apparent from the following detailed description taken in conjunction with the accompanying drawings.

BRIEF DESCRIPTION OF THE DRAWINGS

FIG. 8 is a block diagram showing the construction of a data processing portion;

FIG. 9 is a flowchart showing a foreign substance detecting process;

FIG. 11 is a block diagram showing the construction of a shading compensation portion;

DETAILED DESCRIPTION OF THE PREFERRED EMBODIMENTS

Figure 1:
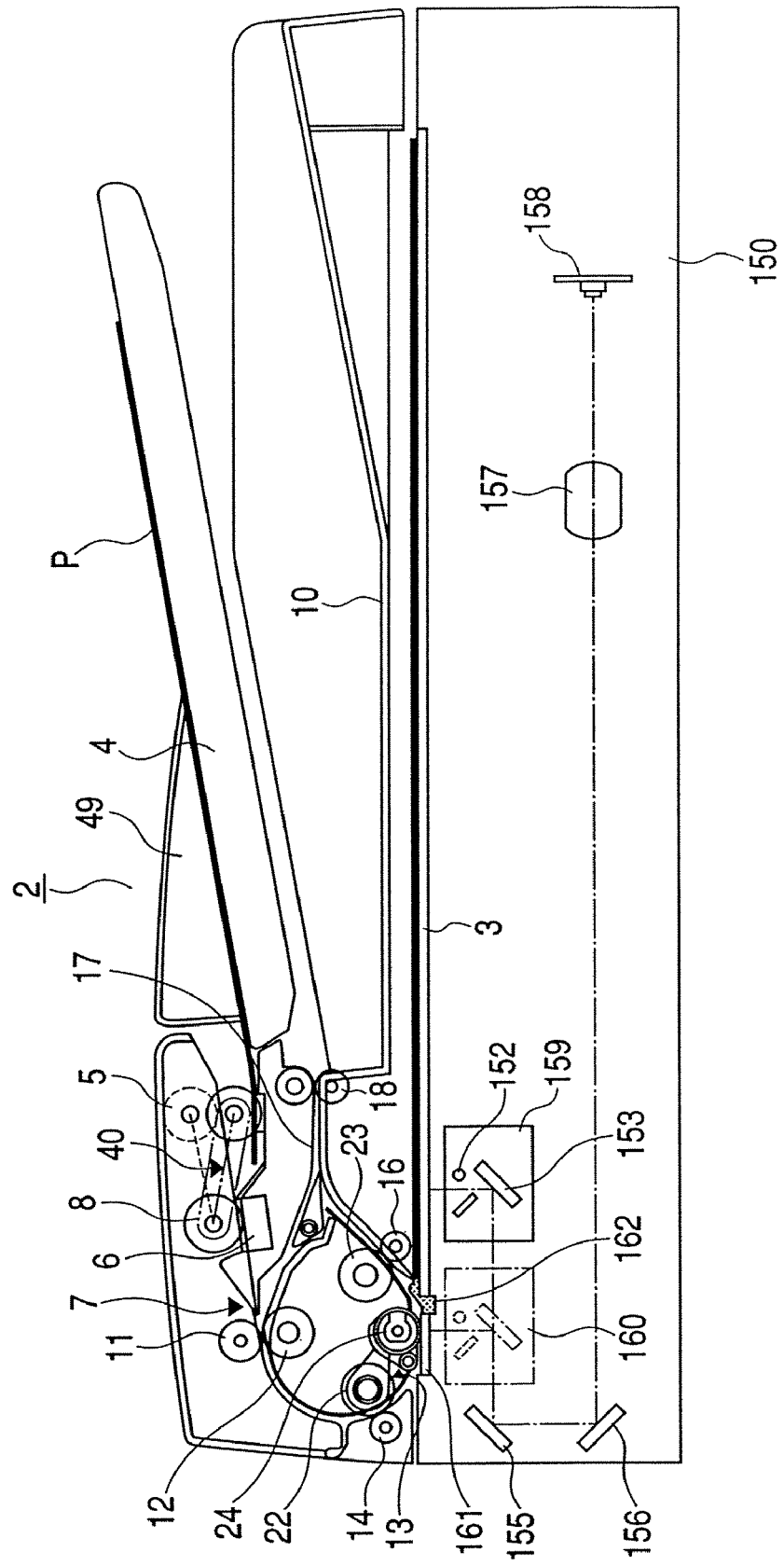
FIG. 1 is a sectional view showing the construction of an original treatment apparatus and a reader portion according to a first embodiment of the present invention.

The present invention will now be described in detail below with reference to the accompanying drawings showing a preferred embodiment thereof. In the drawings, elements and parts which are identical throughout the views are designated by identical reference numeral, and duplicate description thereof is omitted.

Figure 2:
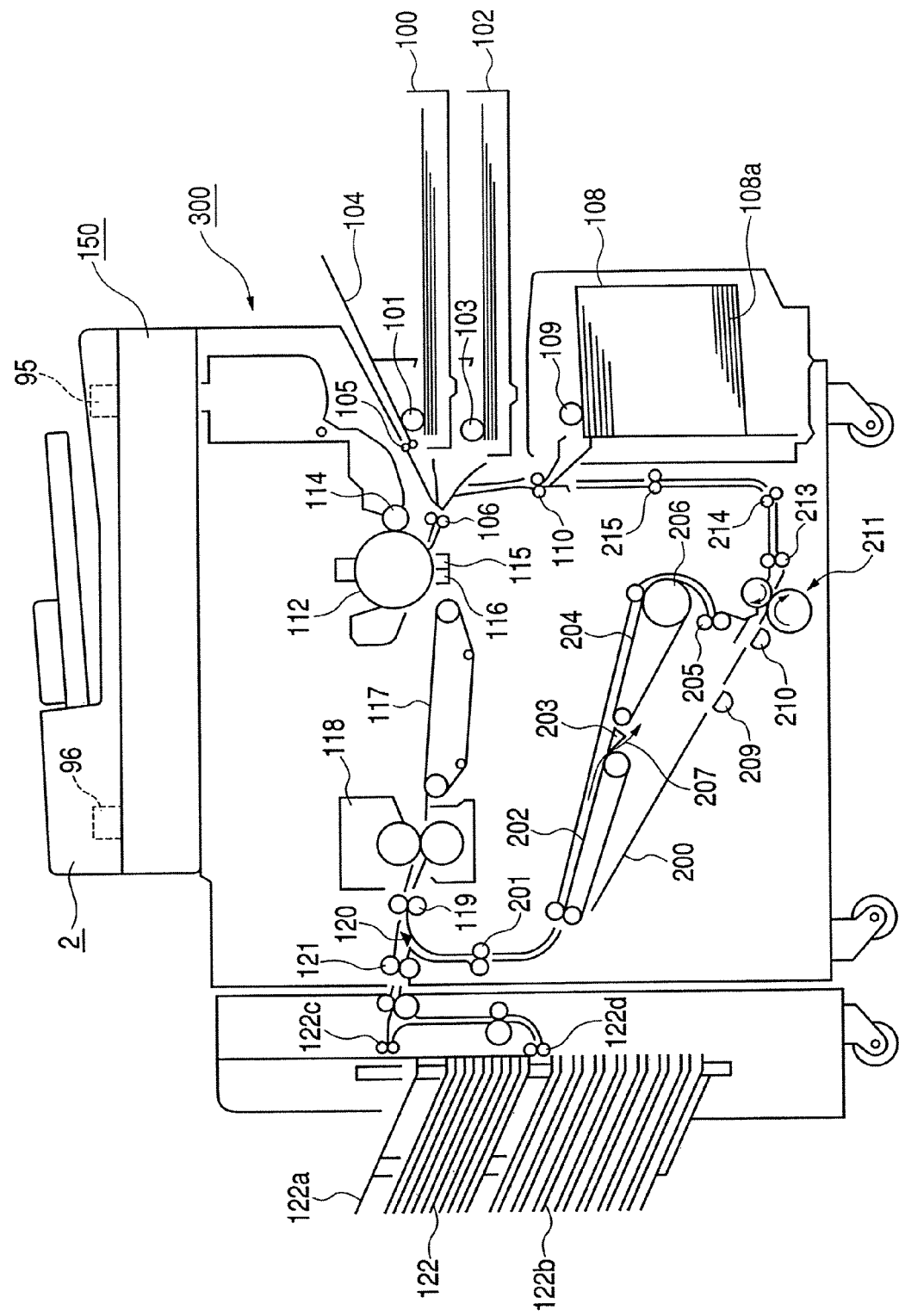
FIG. 2 is a sectional view showing the construction of an image forming apparatus according to the first embodiment of the present invention.

FIG. 1 is a schematic sectional view of an image reading apparatus according to the first embodiment of the present invention. FIG. 2 is a schematic sectional view of an image forming apparatus according to the first embodiment of the present invention. In the following description, it is assumed that a digital copying machine adopting the electrophotographic process is used as the image forming apparatus. In FIGS. 1 and 2, numeral 150 indicates a reader portion, numeral 2 indicates an original treatment apparatus, and numeral 300 indicates a printer portion.

<Description of the Reader Portion>

The reader 150 has a lamp 152 for irradiating an original surface with light, and mirrors 153, 155, and 156 for guiding reflection light from the original P corresponding to the light emitted from the lamp 152 to a lens 157 and a CCD 158. The lamp 152 and the mirror 153 are mounted to a first optical stand 159, and the mirrors 155 and 156 are mounted to a second optical stand 151 (not shown). Further, the optical stands 159 and 151 are connected to a motor 314 (see FIG. 5) by a wire (not shown), and are controlled to move parallel to the original glass table 3 through rotation of the motor 314. A position sensor 315 (see FIG. 3) is a sensor for detecting the home position of the first optical stand 159. Using the position of the position sensor 315 as a reference, the motor 314 is caused to make normal and reverse rotation, whereby the optical stands 159 and 151 are moved to optically scan the original on the original glass table 3.

Further, the motor 314 is formed by a stepping motor. An encoder 302 (see FIG. 3) is connected to the motor 314, and from the output of the encoder 302, it is possible to recognize by how many pulses the optical stands 159 and 151 have moved. That is, it is possible to ascertain the positions of the optical stands 159 and 151 by the position sensor 315 and from the encoder pulses from the encoder 302. The reflection light from the original is guided to a lens 157 by way of the mirrors 153, 155, and 156, and condensed on a CCD 158 by the lens 157. The CCD 158 effects photoelectric conversion on the reflection light reflecting the original information, and outputs it as an electronic image signal. In this construction, it is possible to read original information in the two modes: a flow reading mode in which the original information is read while transporting the original by the ADF 2, with the first optical stand 159 being at rest at an original reading position 160, and an original glass table reading mode in which the original information is read while moving the optical stands 159 and 151 in the sub scanning direction, with the original being fixedly placed on the original glass table 3.

Figure 3:
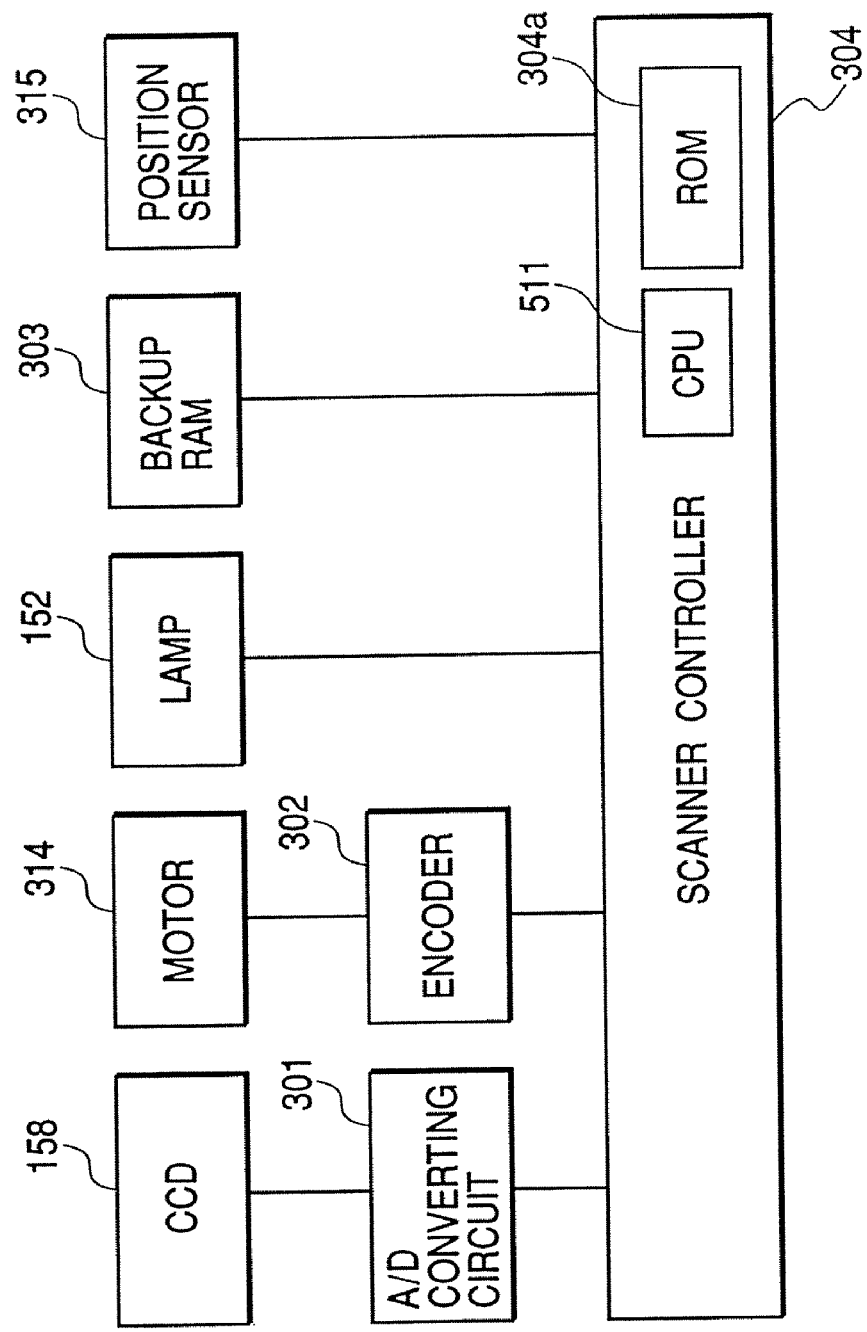
FIG. 3 is a block diagram showing the construction of the control system of the reader portion.

FIG. 3 is a block diagram schematically showing the construction of the control system of the reader. The system includes the lamp 152 for irradiating the original surface with light, the motor 314 for moving the optical stands 159 and 151 in the sub scanning direction to scan the original, the CCD 158 for effecting photoelectric conversion on the reflection light from the original surface, an A/D converting circuit 301 for A/D converting the output signal of the CCD 158, the encoder 302 connected to the motor 314, the lamp 152 for irradiating the original with light, the position sensor 315 for effecting positioning on the optical stand 159 at the home position, a backup RAM 303 for setting the normal original reading position in the ADF original reading mode, and a scanner controller 304.

<Description of the Printer Portion>

The printer portion 300 is an image forming means using a well-known electrostatic latent image formation technique. The printer portion 300, constituting the image output portion, will be described with reference to FIG. 2. Numeral 100 indicates an upper cassette. The sheets in the cassette are fed one by one by the action of a separation claw and a feeding roller 101, and are guided to register rollers 106. Numeral 102 indicates a lower cassette. The sheets in the cassette are fed one by one by the action of a separation claw and a feeding roller 103, and are guided to the register rollers 106. Numeral 104 indicates a manual feed guide, by which sheets are guided one by one to the register rollers 106 by way of rollers 105. Numeral 108 indicates a sheet stacking device (deck type), which is equipped with an inner plate 108a to be raised and lowered by a motor or the like. The sheets on the inner plate 108a are fed one by one by the action of a feeding roller 109 and a separation claw, and are guided to transport rollers 110.

The image forming portion is formed by a photosensitive drum 112, a developing device 114, a transfer charger 115, and a stripping charger 116.

Numeral 117 indicates a conveyor belt for conveying sheets with images formed thereon. Further, there are provided a fixing device 118, transport rollers 119, and a diverter 120. A sheet material with an image formed thereon is guided to discharge rollers 121 by the diverter 120 and transported into a sorter 122. The sorter 122 has a non-sort tray 122a, sort bin trays 122b, non-sort tray discharge rollers 122c, and sort bin tray discharge rollers 122d. The non-sort tray and the sort-bin trays ascend and descend to sort the sheets stage by stage. In some cases, a discharge tray is mounted instead of the sorter.

In the case of duplex copying and multiple copying, the sheets after fixing are branched off by the diverter 120, and are transported by transport rollers 201. In the case of duplex copying, they are discharged onto an intermediate tray 200 by way of belts 202 and 204, a path 206, and discharge rollers 205. In the case of multiple copying, the sheets are discharged onto the intermediate tray 200 by a diverter 203. Numerals 209 and 210 indicate semicircular rollers for feeding the sheets, numeral 211 indicates a separation roller pair, and numerals 213, 214, and 215 indicate transport rollers for transporting the sheets to the register rollers 106.

<Description of the Original Treatment Apparatus>

The original treatment apparatus (auto document feeder) 2 is provided above the reader portion 150 so as to be capable of being opened and closed with respect to the platen glass plate 161 and the original glass table 3 through hinge mechanisms 95 and 96. The original treatment apparatus 2 will be described in detail below with reference to the drawings.

<Description of the Original Tray Portion>

In FIG. 1, an original tray 4 serves to allow originals P in the form of sheets to be stacked thereon. On the original tray 4, a pair of width direction regulating plates are arranged so as to be slidable in the width direction of the originals. The width direction regulating plates regulate the width direction of the originals P stacked on the original tray 4, thereby securing transport stability during feeding.

<Description of the Separating Portion>

Above the original tray 4, there is provided a sheet feeding roller 5. The sheet feeding roller 5 rotates with the rotation of a separation transport roller 8 to feed the sheet originals. Normally, the sheet feeding roller 5 is retracted to an upper position (indicated by the broken line in the drawing), which constitutes the home position, so as not to hinder the original setting operation. When sheet feeding operation is started, it is lowered to the position indicated by the solid line in the drawing to abut the upper surface of the originals P. The sheet feeding roller 5 is rotatably supported by an arm (not shown), so that the sheet feeding roller 5 can be moved up and down by swinging the arm. A separation pad 6 is arranged on the side opposing the separation transport roller 8, applying pressure to the separation transport roller 8. The separation pad 6 is formed of a rubber material or the like of lower friction than the separation transport roller 8, and is adapted to treat one by one the originals P fed by the sheet feeding roller 5, feeding them by the separation transport roller 8.

<Description of the Transport Portion>

A register roller 12 and a driven register roller 11 are register means for aligning the leading edge of the original fed by the separating portion. The leading edge of the separated original is caused to abut the pair of register rollers 11 and 12 at rest to generate a loop in the original to thereby align its leading edge. Next, the original is transported toward the platen glass plate 162 by a lead roller 22 and a driven lead roller 14. The original transported to the platen glass plate 161 is scooped up by a jump stand 162, and are transported by a lead discharge roller 23 and a driven lead discharge roller 16. When image reading is completed, the original is discharged onto a discharge tray 10 by discharge rollers 18.

In the duplex copying mode, the original is not discharged by the discharge rollers 18 but is switched back to be transported to the register rollers 11 and 12 while being guided by the sheet path above. When the original reaches the register rollers 11 and 12, the reverse side of the original is read in the same manner as described above.

<Description of the Drive System>

Figure 5:
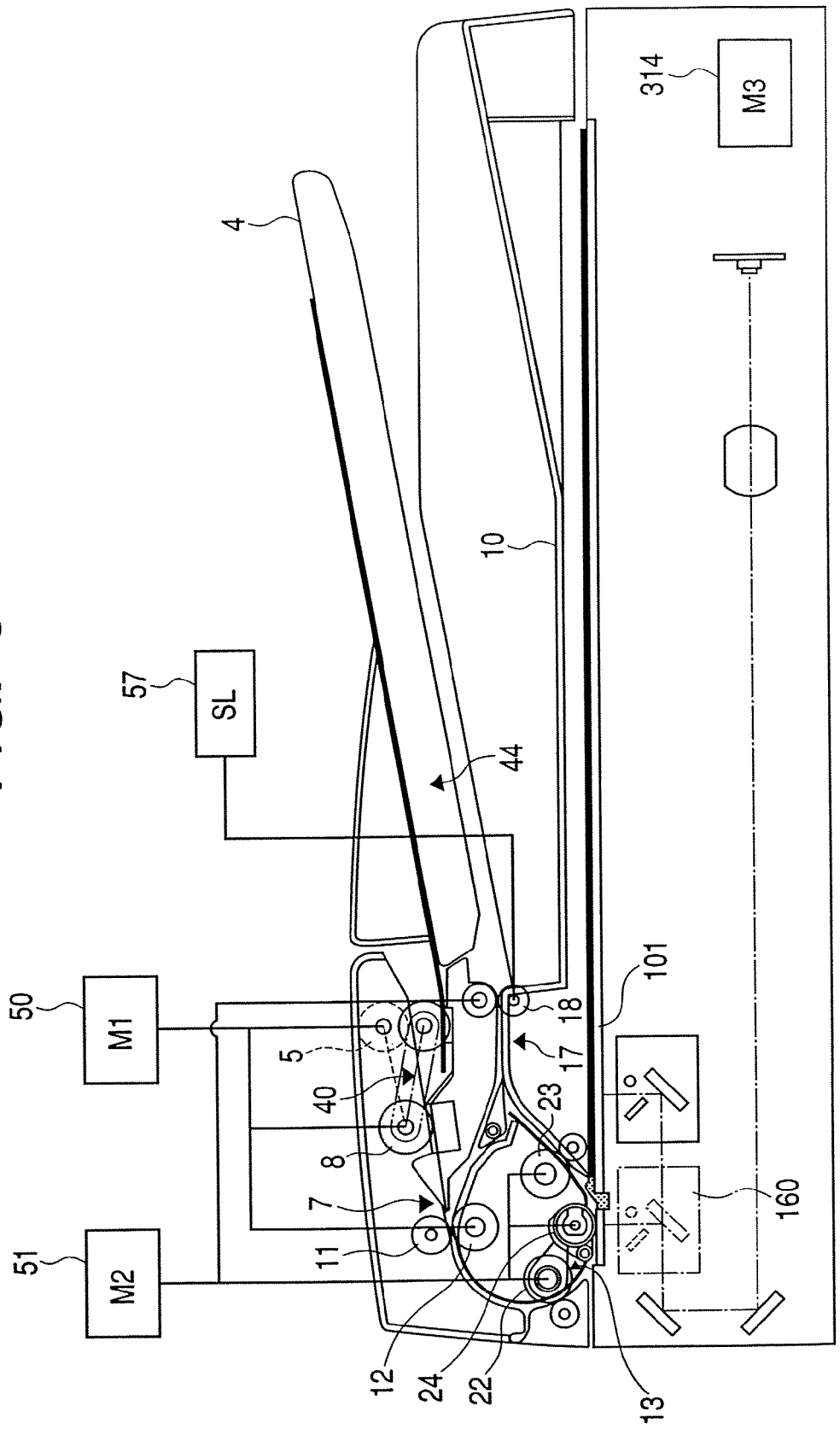
FIG. 5 is a diagram showing the drive system of the original treatment apparatus.

The drive system for driving the rollers, etc. will be described with reference to FIG. 5. A separation motor 50 is a stepping motor which separates and transports the originals through normal and reverse rotation. When the separation motor 50 rotates in the feeding direction, the sheet feeding roller 5 is lowered from the upper position (indicated by the broken line in the drawing) constituting the home position, and is brought into press contact with the uppermost one of the sheet originals on the original tray 4. At the same time, the sheet feeding roller 5 and the separation roller 8 are driven. When the separation motor 50 rotates in the transport direction, which is reverse to the sheet feeding direction, the sheet feeding roller 5 is raised to the upper position (indicated by the broken line in the drawing) constituting the home position to be retained there, and, at the same time, the register roller 12 is driven. A read motor 51 is a stepping motor for driving a read roller 22, a platen roller 24, a read discharge roller 23, and delivery rollers 18. Each roller is driven at the speed at which the original being transported is read. A spacing solenoid 57 brings the driven rollers of the delivery rollers 18 into press contact with each other and separate them from each other at the time of switch back of a two-side original.

<Description of the Sensor>

Each sensor will be described with reference to FIG. 5. The original tray 4 is equipped with an original setting detection sensor 40, which is a transmission type sensor, for detecting the setting of sheets original P thereon. Further, provided under the original tray 4 is a sheet width detection sensor 44 for detecting the length in the width direction of the bundle of originals P set on the original tray 4 by detecting the position of a side guide. Between the separation roller 8 and the register roller 12, there is provided a register sensor 7, which is a transmission type sensor for detecting an original. The register sensor 7 detects the leading edge of an original separately fed, and detects the timing with which the abutting amount (loop amount) with respect to the register roller 12 is controlled, etc. Immediately after the read roller 22, there is provided a read sensor 13 which is a reflection type optical sensor for detecting an original, providing a reference signal for the timing with which image reading is to be started at the reading portion 160. Immediately before the delivery roller 18, there is provided a delivery sensor 17 which is a transmission type optical sensor for detecting an original, detecting the timing with which the original is delivered, etc.

<Description of the Feeding Operation>

When the originals P on the original tray 4 are detected by the original setting sensor 40, the sheet feeding roller 5 is lowered and abuts the bundle of original sheets. When the copying condition is input at the operating portion of the image forming apparatus and the start key is depressed, the detection of the original size is effected by the original width sensor 44 on the original tray 4. Further, the retention by a separation solenoid 57 is canceled, and the originals advance to the downstream side under the feeding force of the sheet feeding roller 5.

Next, the originals P from the original tray 4 are transported one by one to the downstream side. The original P having passed the separating portion is transported by the register rollers 12 with its leading edge aligned by the register rollers 12. When its leading edge reaches the read roller 22, the original is transported toward the platen glass plate 161, and image reading is effected by the reading unit 160 while transporting the original by the platen roller 24 and the read discharge roller 23. When the image reading has been completed, the originals are stacked on the delivery tray 10 by the delivery roller 18. In the case of the duplex copying mode, the original is not discharged toward the delivery roller 18, but switched back to be transported toward the register rollers 11 and 12 while being guided by the sheet path above. When the original reaches the register rollers 11 and 12, the reverse side of the original is read in the same manner as described above.

<Block Description of the Control Circuit>

Figure 4:
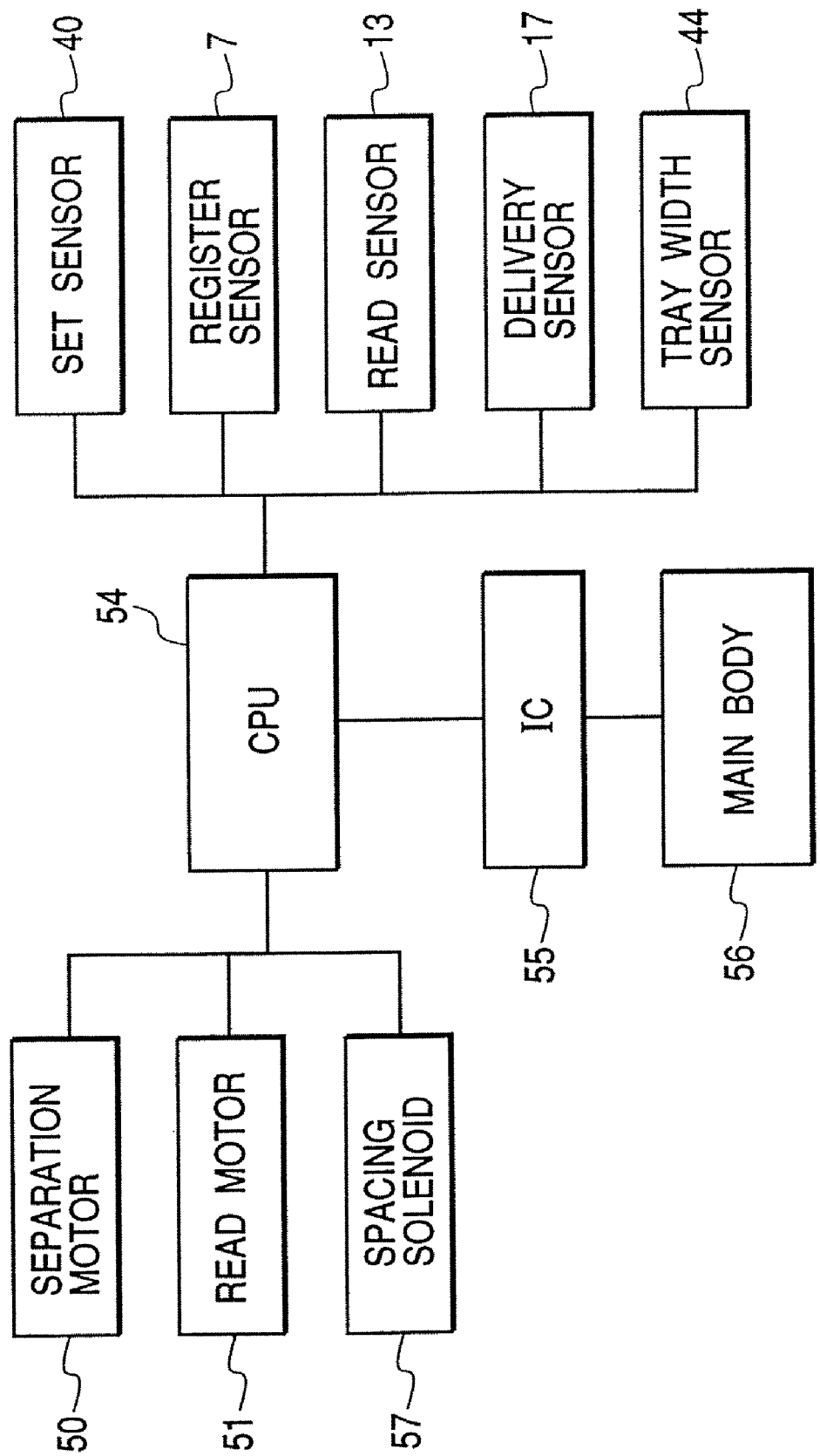
FIG. 4 is a block diagram showing the circuit configuration of an ADF.

FIG. 4 is a block diagram showing the circuit configuration of the control circuit for the ADF of this embodiment. The control circuit is formed using a microprocessor (CPU) 54 as a main component. Connected to the input/output ports of the CPU 54 are drive circuits and sensors of various loads. Further, the control circuit is equipped with a RAM backed up by a battery (not shown) and a ROM storing a control sequence software. Further, numeral 55 indicates a communication IC for controlling data communication with the image forming apparatus main body.

The separation motor 50 and the read motor 51 are driven by the respective stepping motor drivers. Input to each driver is a mutual excitation signal from the CPU 54 and a motor current control signal. The spacing solenoid 57 is driven by a driver, and its operation is controlled by a signal connected to the input/output ports of the CPU 54. The various sensors, such as a register sensor 7, a set sensor 40, a read sensor 13, a delivery sensor 17, and the tray width sensor 44, are connected to the input port of the CPU 54, and are used to monitor the behavior of the originals and the behavior of the movable loads in the apparatus.

<Description of the Reading Portion>

Figure 6:
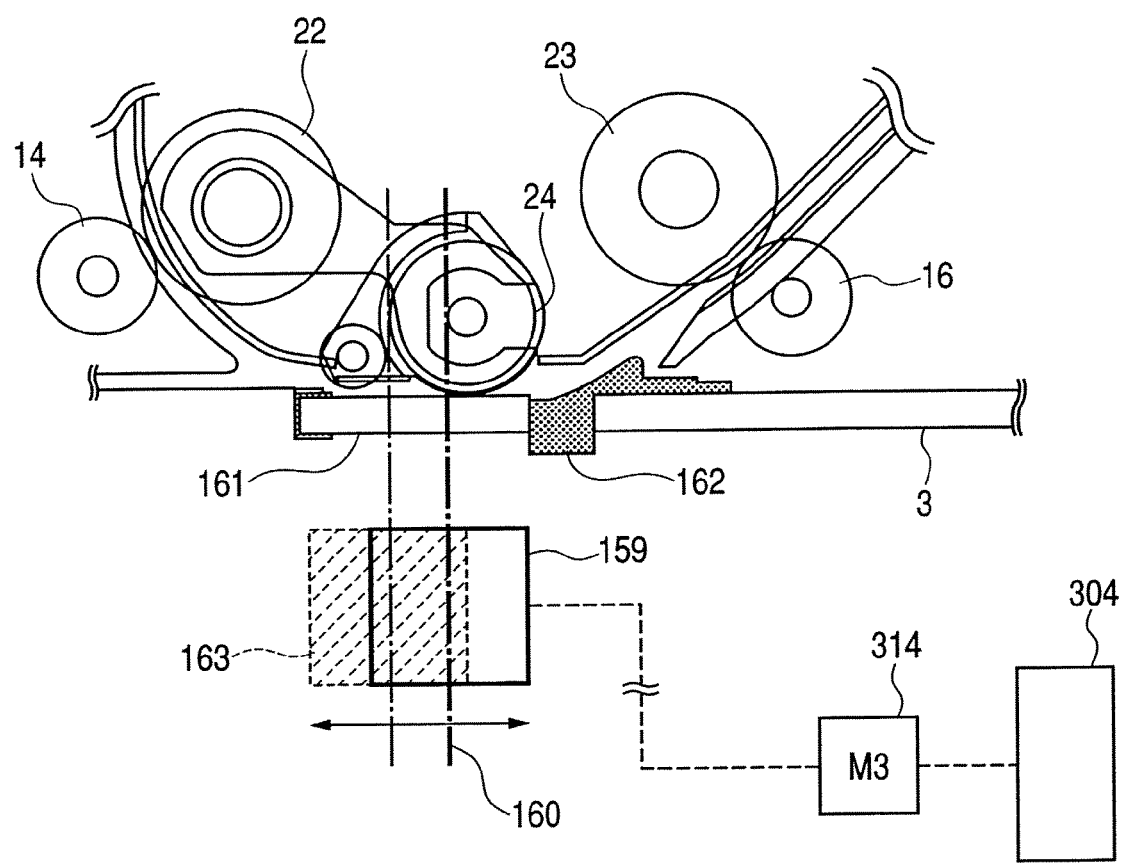
FIG. 6 is a diagram showing the construction of an original reading portion.

The original reading portion will be described with reference to FIGS. 6 and 7. Numeral 161 indicates the platen glass plate, whose surface has an EC coating (transparent conductive coating). Numeral 27 indicates an aluminum sheet attached to the platen glass plate so as to extend from the obverse to the reverse side thereof by means of a conductive double-faced tape. Numeral 26 indicates a resin sheet which protects the aluminum sheet. Numeral 24 indicates a white platen roller, which rotates in the transport direction by driving the read motor 51. The gap between the platen roller 24 and the platen glass plate 161 is guaranteed to be 0.15 mm by a glass abutting means (not shown). Numeral 25 indicates a driven sheet-presser roller spaced apart from the platen glass plate by a gap guaranteed to be 0.8 mm.

Numeral 28 indicates a white polyester film which is mounted to a guide member holding the platen roller 24 and the sheet-presser roller 25 and which is provided so as to be swingable using a read roller 22 as a fulcrum, stabilizing the degree of whiteness of the portion around the platen roller 24.

The original P is transported on the plate glass 161 at a fixed speed while regulated by the platen roller 24, the platen glass plate 161, the sheet regulating roller 25, and the jump stand 162. In this process, the original exhibits a region A which is in the vicinity of the point directly below the platen roller 24 and which is in contact with the platen glass plate 161, and a region B which is below the white guide 28 and which is not in contact with the platen glass plate 161. Each of the regions A and B is a reading region having one or a plurality of reading positions. They will be described in detail below.

At this time, the first optical stand 159 can be moved by the motor 319 to be controlled so as to appropriately select between the region A (the first reading region) 160 and the region B (the second reading region) 163. While in this example reading is performed by a reduction optical system allowing movement of the first optical stand 159, it is also possible to adopt a contact image sensor also allowing movement of a reading device, etc.

FIG. 8 is a block diagram showing the construction of a data processing portion for image data processing including a foreign substance detecting circuit of the image reading apparatus of this embodiment. The data processing portion is composed of a CCD 158 (hereinafter referred to as the image sensor) for performing photoelectric conversion on the reflection light from the original surface, an A/D conversion circuit 301 for A/D converting the output signal of the image sensor 158, a shading compensation circuit 503, a foreign substance detecting circuit 509, and a CPU 511. Further, the foreign substance detecting circuit 509 is equipped with a binarizing circuit 504 for detecting foreign substance, an addition circuit 505, a line memory 506, a binarizing circuit 507 for foreign substance determination, and a foreign substance counting circuit 508. While this data processing portion is arranged in the reader portion 150, it may also be partly provided in the printer portion 300.

The image sensor 158 performs photoelectric conversion based on reflection light from an original, and outputs an electric signal. Then, the A/D conversion circuit 301 converts an analog signal (electric signal) output from the image sensor 158 to a digital signal. The shading compensation circuit 503 performs shading compensation based on the output of the A/D conversion circuit 301, and outputs the image signal after the shading compensation to the binarizing circuit 504 for foreign substance detection of the foreign substance detecting circuit 509 as a read image signal. In the binarizing circuit 504 for foreign substance detection, the image signal after the shading compensation is compared with a predetermined foreign substance determination threshold value to effect binarization. The addition circuit 505 adds together the output of the binarizing circuit 504 for foreign substance detection and the output of the line memory 506. The line memory 506 stores data related to cumulative addition for each pixel.

The binarizing circuit 507 for foreign substance determination compares the cumulative addition value for each pixel with a predetermined foreign substance determination threshold value, and determines that there is foreign substance with respect to a pixel in which the predetermined foreign substance determination threshold value is exceeded. The foreign substance counting circuit 508 can detect the number of pieces of foreign substance and the foreign substance width based on the output of the binarizing circuit 507 for foreign substance determination. Here, the foreign substance width indicates the number of consecutive pixels in the main scanning direction judged to have foreign substance. When the number of pieces of foreign substance is counted, a piece of foreign substance of a considerable width is counted as one. Then, information is output, which indicates that there are N pieces of foreign substance having the width of M pixels (M and N are natural numbers).

The foreign substance correcting circuit 510 is a circuit that performs correction on a pixel judged to have foreign substance by the binarizing circuit 507 for foreign substance determination. The correction is effected through linear interpolation referring to the value of the normal one of the right and left pixels adjacent to the pixel judged to have foreign substance. However, in reality, there are limitations in the correction for eliminating the influence of foreign substance, so that an optimum reading position is set by the CPU 511 based on the output of the foreign substance counting circuit 508, taking into account the number of pieces of foreign substance and the foreign substance width.

Next, the foreign substance detecting process will be described with reference to FIG. 9. In step 701 (indicated as S701 in FIG. 9), foreign substance detection is effected in a state in which the original is not being read at the reading position, such as after completion of original reading, and in which the platen roller 24 is rotating at the reading position. Here, a plurality of reading positions are set (in this case, three reading positions of Y1, Y2, and Y3 are set at intervals of 0.5 mm). When the surface of the platen roller 24 is read, the signal output from the image sensor 158 is converted to a digital signal by the A/D converter 301. Then, shading compensation is effected at the shading compensation circuit 503, and an image signal is output. The image signal after the shading compensation is input to the foreign substance detecting circuit 509. In the foreign substance detecting circuit 509, the binarizing circuit 504 for foreign substance detection compares the image signal after the shading compensation with the foreign substance detection threshold value to thereby effect binarization. Here, the binarization is effected such that the case in which the foreign substance detection threshold value is not exceeded is indicated as "1", and that the case in which the threshold value is exceeded is indicated as "0". The binarized image data undergoes cumulative addition pixel by pixel by the addition circuit 505 and the line memory 506. The cumulative addition is effected for a predetermined number of lines. Here, the following two cases are possible: a case in which the lines constituting the object of cumulative addition are consecutive lines, and a case in which cumulative addition is effected on intermittently arranged lines at intervals of X lines. By thus effecting cumulative addition pixel by pixel on the image data thus binarized, the cumulative addition value for a pixel judged to have foreign substance is given as a large value.

The binarizing circuit 507 for foreign substance determination compares the cumulative addition value for each pixel with the foreign substance determination threshold value, and judges a pixel involving a value exceeding the threshold value to have foreign substance. Here, binarization is effected such that the case in which the foreign substance determination threshold value is not exceeded is indicated as "0", and that the case in which the threshold value is exceeded is indicated as "1". On the basis of the output of the binarizing circuit 507 for foreign substance determination, the foreign substance counting circuit 508 detects the number of pieces of foreign substance and the foreign substance width. On the basis of the detection result of the foreign substance counting circuit 508, information that there are N pieces of foreign substance having the width of M pixels (M and N are natural numbers) is output. For example, information is given that there are four pieces of 1-pixel foreign substance, three pieces of 2-pixel foreign substance, and zero pieces of 3-pixel foreign substance.

Next, in step 702, a judgment is made as to whether there is any foreign substance based on the output of the foreign substance counting circuit 508. When it is determined that there is no foreign substance, the foreign substance detecting process is completed, and the next original is read at the current reading position. When it is determined that there is some foreign substance, a judgment is made as to whether it has been determined that there is foreign substance at all the Y (Y1, Y2, and Y3) set reading positions (step 703). When there is any position where foreign substance detecting process has not been effected yet, movement is effected to that position where foreign substance detecting process has not been effected yet, and the foreign substance detecting process of step 701 is effected. In the case in which foreign substance detecting process has been effected at all the Y positions, the foreign substance detecting process is completed. Here, Y=3, and the distance between the adjacent reading positions is 0.5 mm.

Figure 10B:
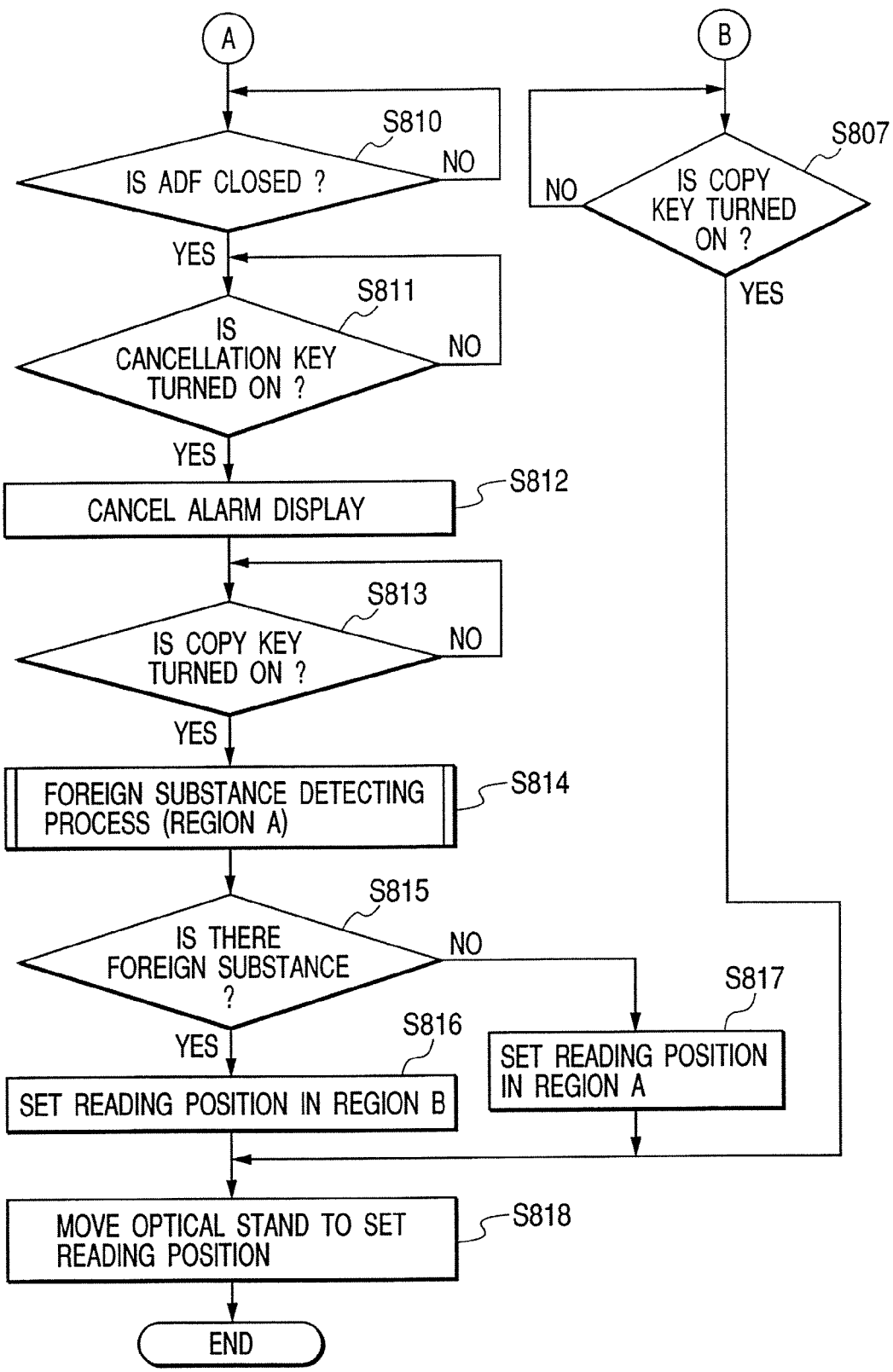
FIG. 10 is comprised of FIGS. 10A and 10B for flowcharts showing a reading position adjustment process.

Next, the adjustment of the original reading position will be described with reference to FIGS. 10A and 10B. FIGS. 10A and 10B are flowcharts illustrating a reading position adjustment process. The adjustment of the reading position is effected after the completion of original reading (completion of the reading job), when the power source for the reading device is turned on, etc.

Figure 7:
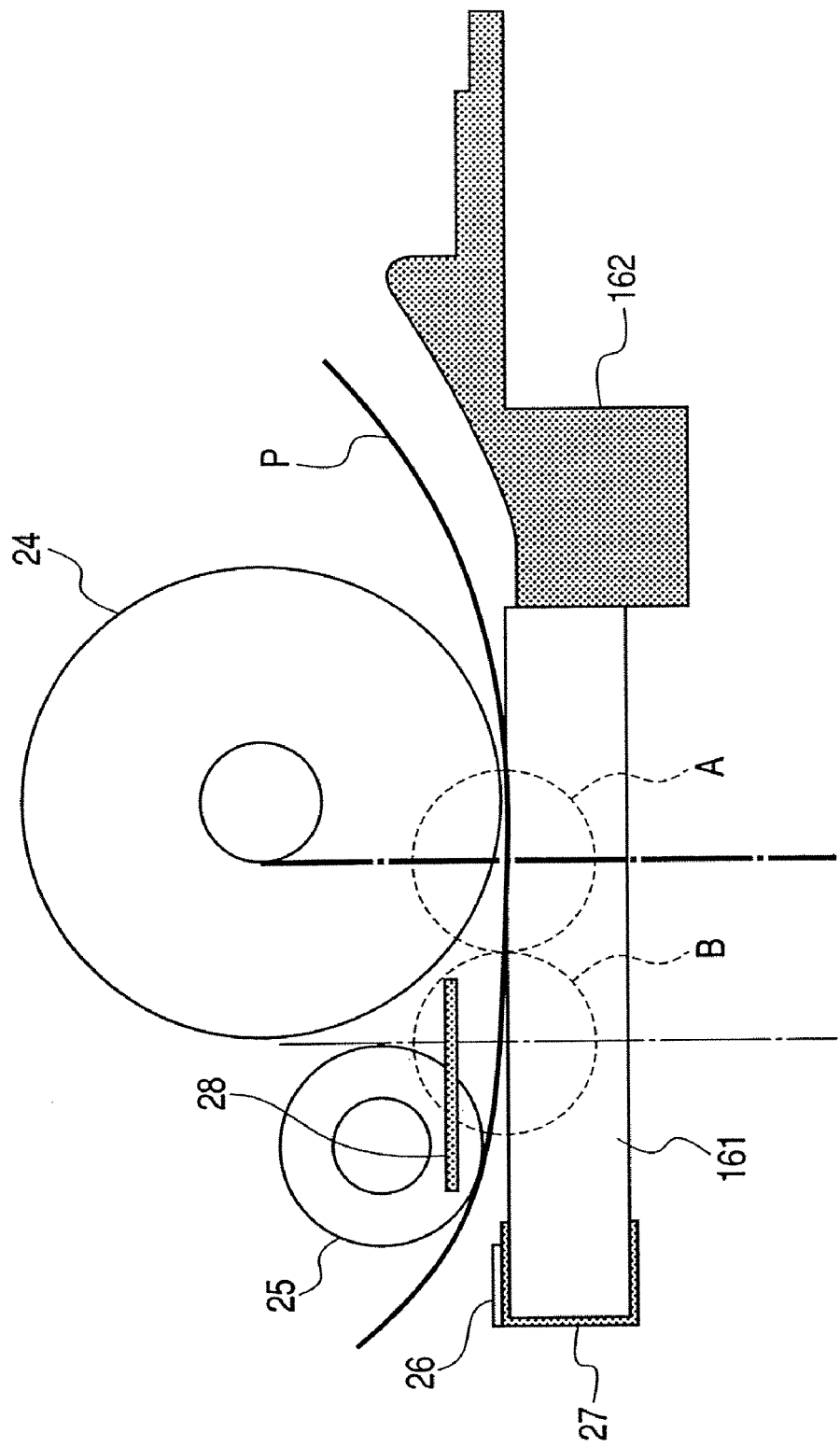
FIG. 7 is a detailed view of the original reading portion.

In step 801, foreign substance detecting process is executed in the region A of FIG. 7 (a region having plurality of reading positions). Then, in step 802, a judgment is made as to whether there is foreign substance at all the reading positions in the region A. When foreign substance is detected at all the reading positions in the region A, the reading position for the next job (the reading position where the original is to be read next) is set as the region B shown in FIG. 7 (a region having a plurality of reading positions) (step 803). When no foreign substance is detected in one of the reading positions in the region A, the reading position for the next job is set in the region A (step 804). At this time, the first optical stand 159 is not actually moved, but only positional information on the reading positions is set. The positional information is retained in the CPU 511 of the scanner controller 304, for example.

Next, in step 805, a judgment is made as to whether the original for the next job has been set on the original tray 4 or not. When the original is set on the original tray 4, it is checked whether the reading position is set in the region B or not (step 806). When the reading position is not set in the region B, the copy key is turned on to execute original reading in the region A shown in FIG. 7. When the reading position is set in the region B, an alarm display demanding cleaning of the platen glass plate is given on the operating portion as a warning for the user (step 808). Here, the message: "PLATEN GLASS PLATE IS SOILED. CLEAN IT WITH CLOTH" is displayed on a liquid crystal display of the operating portion, and the manner in which the cleaning is to be performed is indicated through moving images. While in this case the manner of cleaning is indicated through moving images, a display in which the pictures simply change will also do.

Next, a judgment is made as to whether the ADF 2 is opened by the user to clean the platen glass plate 161, and as to whether the ADF 2 is closed after the completion of the cleaning (steps 809 and 810). Then, when the "CLOSE" key in the liquid crystal screen of the operating portion displaying the alarm is depressed, the alarm display is cancelled (steps 811 and 812). When the alarm display is thus cancelled, and the copy key is turned on after the opening and closing of the ADF, foreign substance detecting process is executed for the second time in the region A shown in FIG. 7 (a region having a plurality of reading positions) (step 814).

Through the second foreign substance detecting process in step 814, a judgment is made as to whether there is foreign substance at all the reading positions in the region A (step 815). When foreign substance is detected at all the reading positions in the region A, the reading position for the next job (the reading position where original reading is to be effected next) is set in the region B shown in FIG. 7 (a region having one or a plurality of reading positions) (step 816). If there is one reading position in the region A where no foreign substance is detected, the reading position for the next job is set at that reading position in the region A (step 817).

Then, the first optical stand 159 is moved to the reading position set in step 816 or step 817 (step 818). After that, the original transported to the reading position is read at that reading position.

As described above, in this embodiment, there are provided two reading regions: the first reading region A which is directly below and in the vicinity of the platen roller and in which the platen glass plate is in contact with the original, and the second reading region B which is below the white guide and in which the platen glass plate and the original are not in contact with each other, allowing appropriate selection through movement of the reading device.

In this way, there is a physical difference in reading position between the first reading region A and the second reading region B. Therefore, when an original is read, there is a difference between the two regions in the quantity of illumination light reflected from the original to impinge upon the reading device, resulting in a difference in white level of the original between the two regions.

Figure 15:
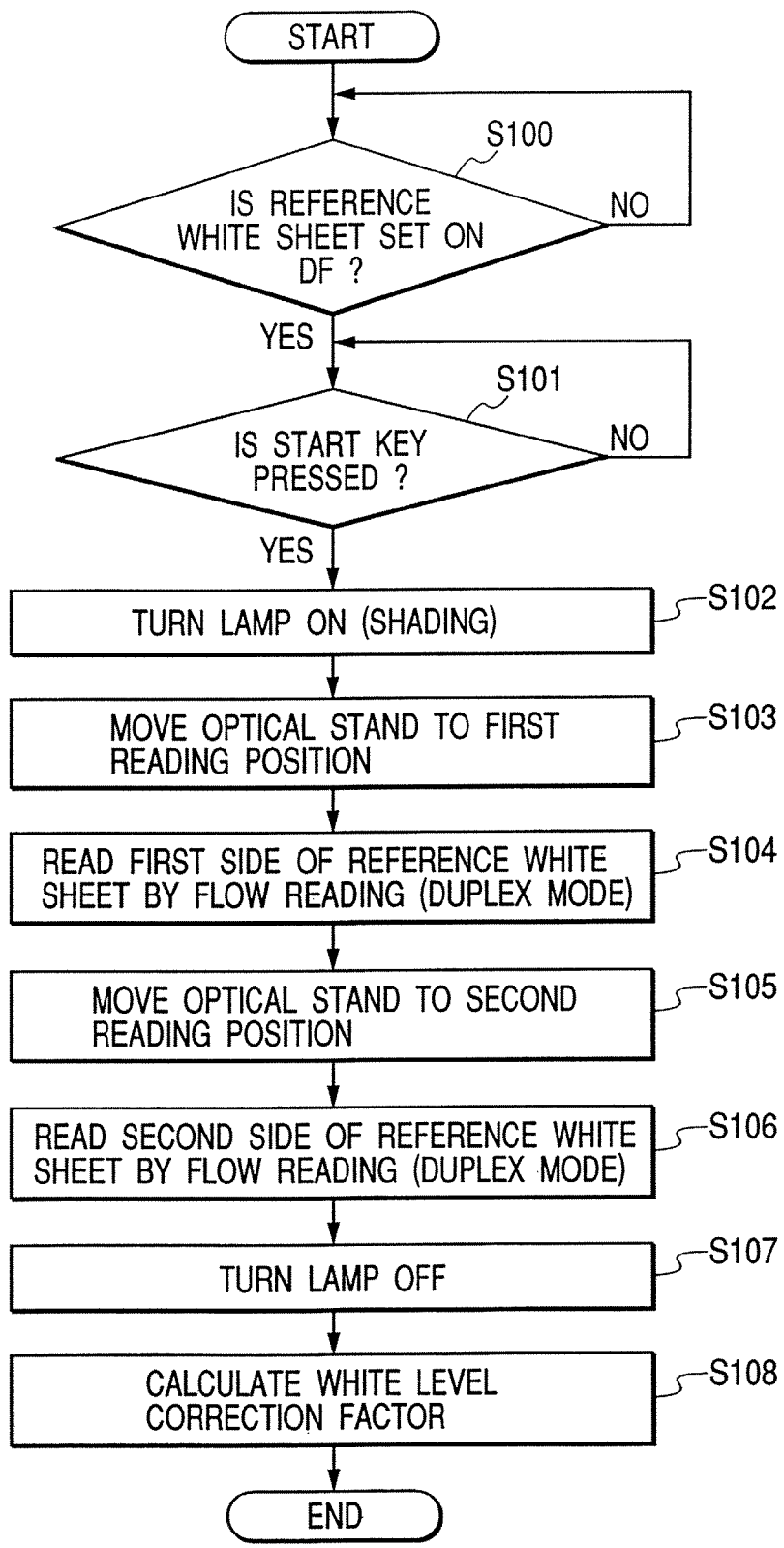
FIG. 15 is a flowchart illustrating a correction data calculation method.

Next, a correction data calculating method for equalizing the white levels of the first reading region A and the second reading region B will be described with reference to the flowchart of FIG. 15. First, in S100, a chart for correction data calculation (reference white sheet) is set on the DF. This reference white sheet may be an SK sheet generally used in offices. After the reference white sheet is placed on the DF in S100, the first optical stand (first mirror stand) 159 waits for depression of the start key in S101. When the start key is depressed in S101, the first mirror stand 159 performs shading compensation (including the turning on of the lamp) at the home position (S102). After S102, the first mirror stand 159 is moved to the first reading position 160 (S103). After S103, two-side reading is effected through DF flow reading to read the first side of the reference white sheet (S104). The reference white sheet reading process will be described below. After S104, the first mirror stand 159 is moved to the second reading position 163 (S105). After S105, the reference white sheet is read again (The second side of the reference white sheet is read through two-side reading) (S106). After S106, the lamp 152 is turned off, and the white level correction factor is calculated (S108). The calculation of the white level correction factor will be described below.

Figure 14:
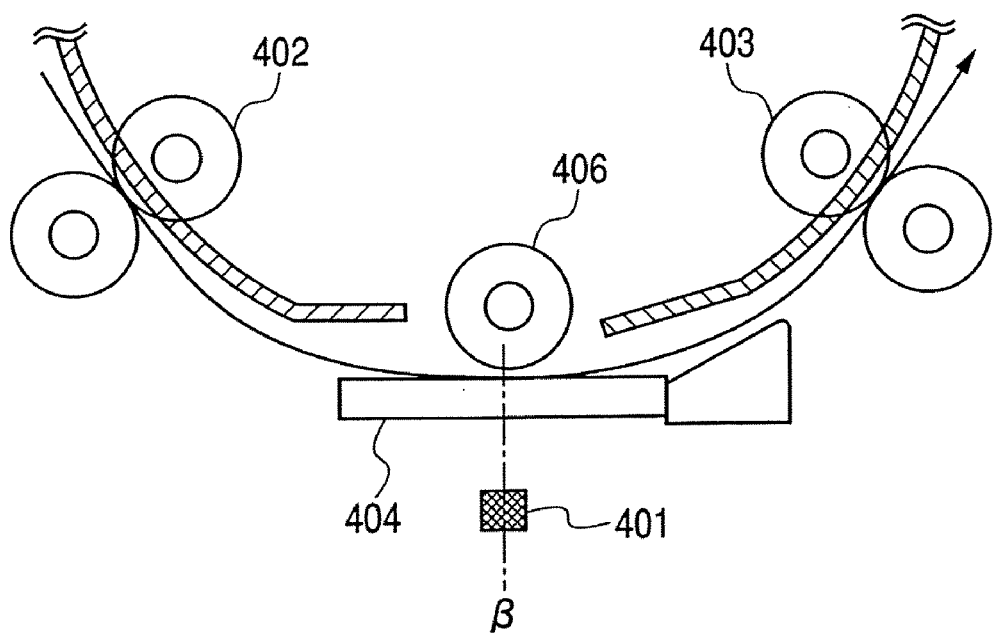
FIG. 14 is a sectional view showing the construction of the portion of the conventional example around the reading position.
Figure 16:
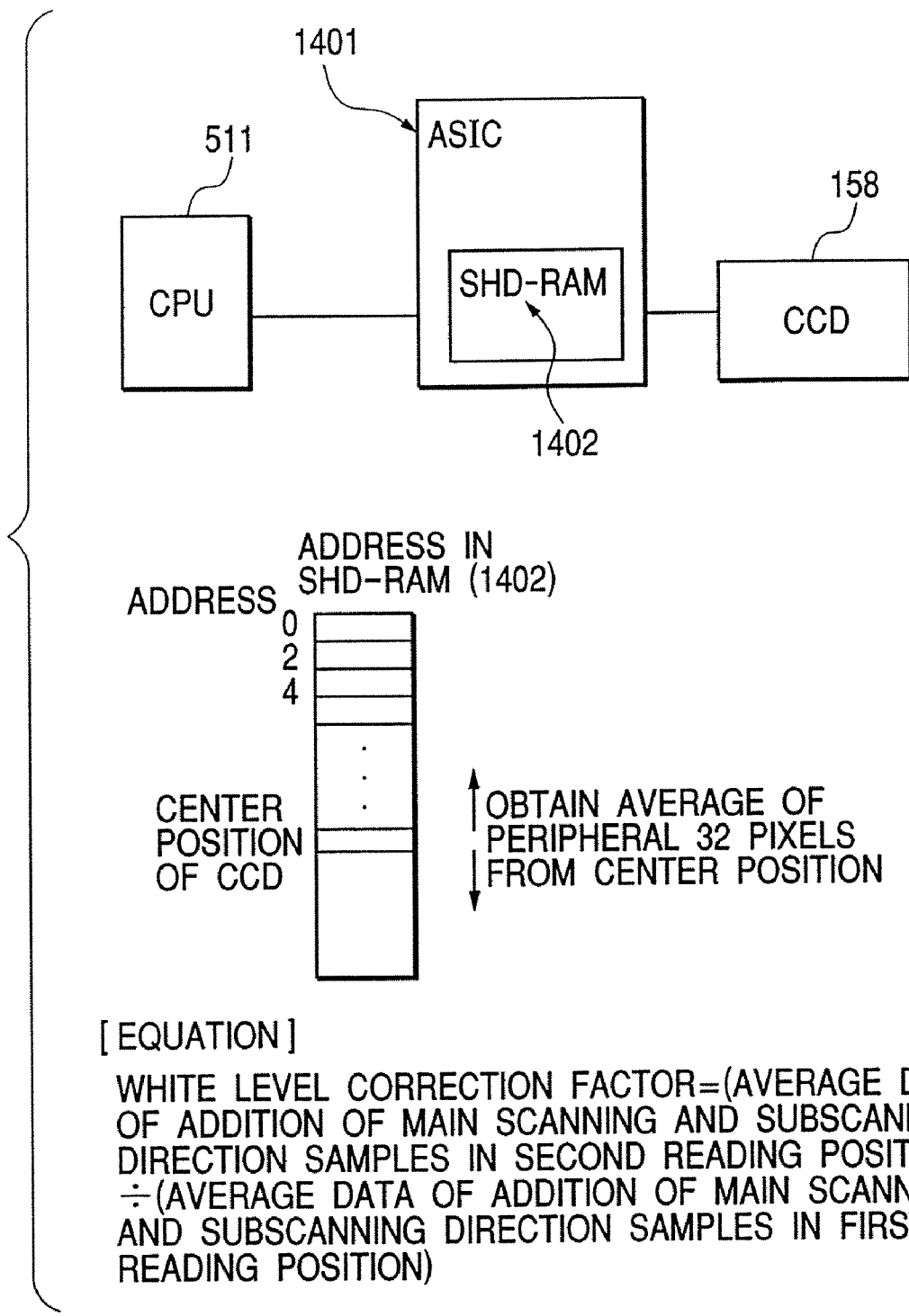
FIG. 16 is a diagram illustrating a reference white sheet reading process and a process for calculating a white level correction factor.

The reference white sheet reading process and the white level correction factor calculating process, mentioned above, will be described with reference to FIG. 16. A CPU 511 is adapted to control the CCD (158) through an ASIC (1401). The CPU 511 and the ASIC (1401) are connected to each other through a bus, and data from the CCD is developed in an SHD-RAM (1402) in the ASIC (1401) through register setting of the ASIC (1401). In performing the operation of developing data in the SHD-RAM (1402), data from the CCD corresponding to several HSYNC lines is added as samples, and the result (average data) obtained by dividing it by the number of sampled lines is input to the SHD-RAM (1402) (=addition-averaging of samples in the sub scanning direction). The data from the CCD is taken in when the reference white sheet transported has substantially reached the central position with respect to the sub scanning direction. The CPU 511 reads the data in the SHD-RAM (1402) in address values, whereby peripheral pixel data with respect to the central position of the CCD is added on a software basis, and divided by the added pixels (=addition-averaging of samples in the main scanning direction. In the drawing, sample addition-averaging is effected with 32 peripheral pixels). The average data of addition of the main and sub scanning direction samples is stored in a work RAM (not shown), and there is obtained the ratio between the average data of addition of the main and sub scanning direction samples at the first reading position 160 (K1) and the average data of addition of the main and sub scanning direction samples at the second reading position 163 (K2), and the ratio is retained in the backup RAM (303) as the white level correction factor (As shown in FIG. 14, it is obtained by dividing K2 by K1).

Next, the process of equalizing the white levels at the first reading position and the second reading position by using the above white level correction factor will be described.

FIG. 11 is a block diagram illustrating the shading compensating portion 503 of this embodiment in detail. In sampling the shading data, the light source is first turned off and black reference data Bk(i) is sampled for each pixel and stored in the line memory 1.

Next, at the position of a white reference plate (not shown), the light source is turned on, and white reference data WH(i) is sampled and stored. Further, the following computation for transformation to white shading compensation data is conducted and the computation result is stored in the line memory 2:

$$1/(WH(i)-Bk(i))$$

In actual image reading, the computation as expressed by the following formula (1) is conducted in real time for each pixel, and data that has undergone shading compensation is output.

$$OUT(i) = (IN(i) - \underbrace{Bk(i)}_{\text{Line Memory 1}}) \times \underbrace{\frac{1}{WH(i) - Bk(i)}}_{\text{Line Memory 2}}$$

where IN(i) is the i-th input data; OUT(i) is the i-th output data; Bk(i) is the i-th black reference data of the line memory 1; and 1/(WH(i)−Bk(i)) is the i-th white shading compensation data.

Next, a method of obtaining the difference in white level between the first reading region A and the second reading region B will be described. When the preparation for shading compensation is completed, a reference white sheet is placed on the ADF2 and flow reading is executed in the first reading region A. At this time, the line memory 506 of FIG. 8 is used to sample and store the read value K1 of the reference white sheet in the first reading region A. More specifically, the reference white sheet is fed by the motor and, when it has substantially reached the central position, the binarizing circuit 504 becomes through, and addition is effected by the addition means 505 by, for example, 64 lines, storing, in the line memory 506, data obtained by performing addition 64 times for each pixel, and 2048 pixels in the central portion with respect to the main scanning direction of the line memory are read by a CPU (not shown) to obtain the average to thereby obtain the read value K1 of the reference white sheet of the first reading region A.

Similarly, the same reference white sheet is set on the ADF 2 and flow reading is executed on the reference white sheet in the second reading region B. At this time, the line memory 506 of FIG. 8 is used to sample the read value K2 of the reference white sheet of the second reading region B. K2/K1 is calculated, whereby the ratio of the white level of the second reading region B to that of the first reading region A is calculated.

Next, a method of correcting the difference in white level between the first reading region A and the second reading region B will be described.

In FIG. 11, numeral 1045 indicates a multiplying means, and numeral 1046 indicates a factor setting means. In the flowchart of FIGS. 10A and 10B, when flow reading is to be conducted in the first reading region A, 1 is set for the factor setting means to effect multiplication by 1 time. When flow reading is to be conducted in the second reading region B, K1/K2, which is the reciprocal of K2/K1 that is the ratio of the white level of the second reading region B to that of the first reading region A, is set in the factor setting means 1046. In this way, it is possible to effect correction such that the white level in original reading when flow reading is conducted is the same between the first reading region A and the second reading region B.

As another method, when white shading compensation data is to be obtained and stored in the line memory 2, the light source is turned on at the position of a white reference plate (not shown) and white reference data WH(i) is sampled and stored, conducting the following computation for transformation to white shading compensation data:

$$1/(WH(i)-Bk(i)) \times (K1/K2)$$

By storing the obtained data in the line memory 2, the shading factor itself includes a ratio factor, whereby it is possible to achieve the same effect as that obtained when the multiplying means 1045 is used. In this case, there is no need to provide the multiplying means 1045.

What is important here is to effect correction through multiplication such that the first reading region A and the second reading region B exhibit the same white level, and there are no particular limitations regarding the mounting form of the multiplying means.

As described above, according to this embodiment, it is possible to prevent generation of a black lined image in the image read at each reading position. Further, there is no difference in white level in original reading between the two reading regions: the first reading region A which is directly below and in the vicinity of the platen roller and in which the platen glass plate and the original are in contact with each other, and the second reading region B which is below the white guide and in which the platen glass plate and the original are not in contact with each other, thus making it possible to read a satisfactory image.

While in the first embodiment a CCD is used as the image sensor for reading images, the same effect as that of the first embodiment can be obtained by using a contact image sensor CIS as the image sensor 158 (see FIG. 8). This example will be described as a second embodiment. The hardware and software constructions of the second embodiment are the same as those of the first embodiment except for the input side of the data processing portion (see FIG. 8), so that the description of the first embodiment will also be applied here, omitting a redundant description. In the case of this embodiment, it is necessary to provide an image data sorting portion between the A/D converting means 301 and the shading compensation means 503 in FIG. 8.

Figure 12:
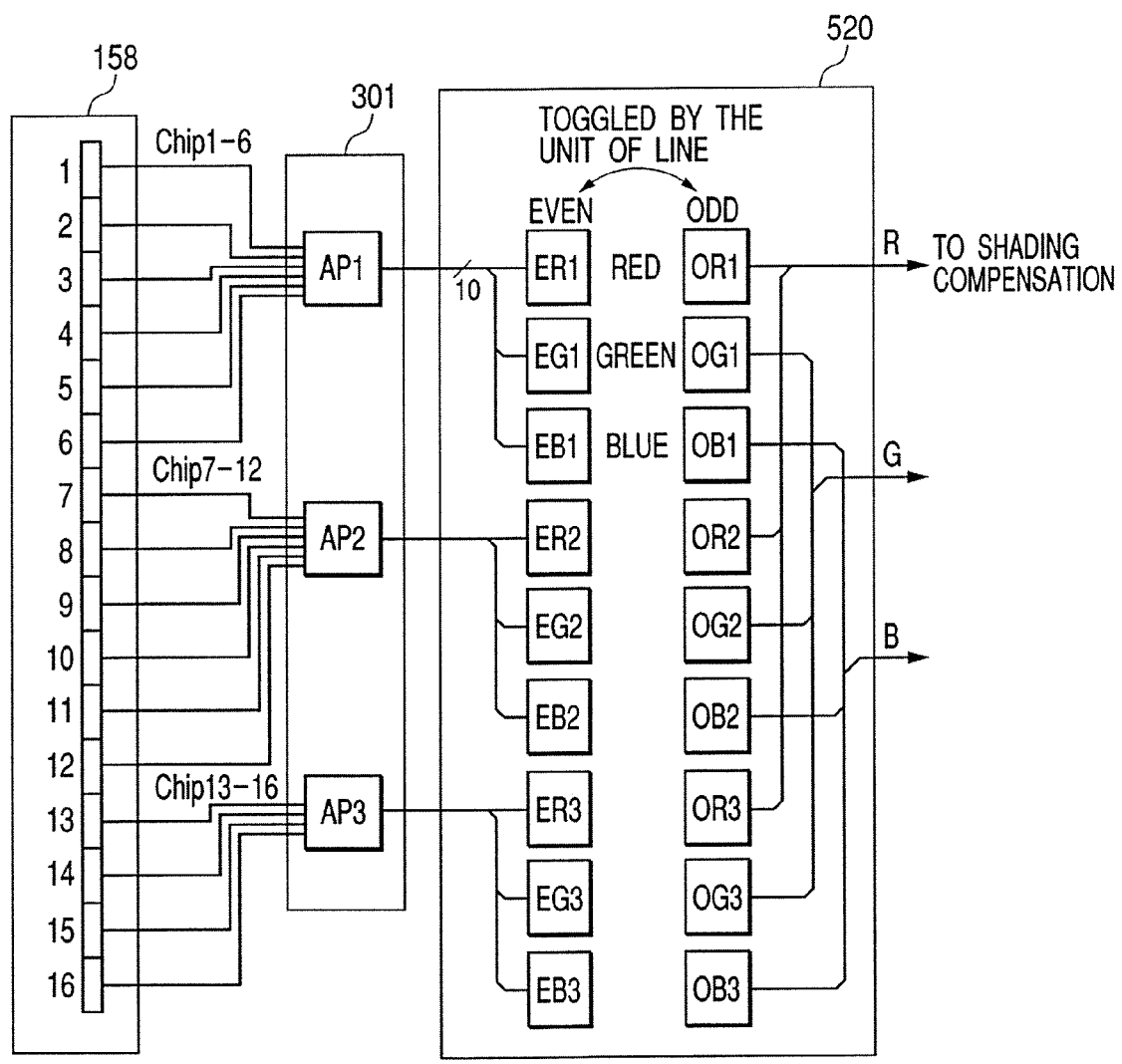
FIG. 12 is a diagram showing the construction of a sorting portion according to a second embodiment of the present invention.
Figure 13:
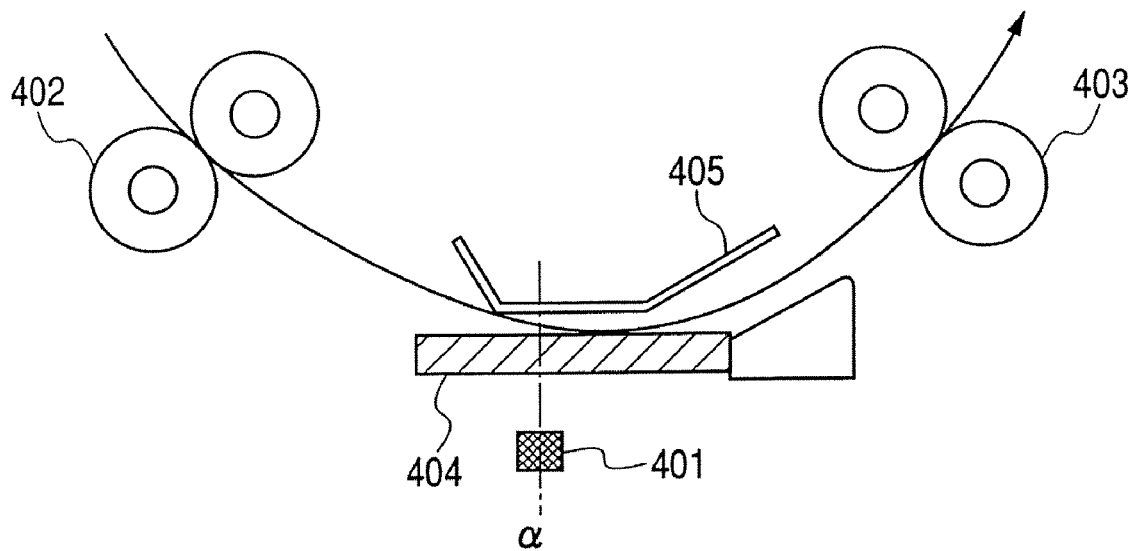
FIG. 13 is a sectional view showing the construction of the portion of a conventional example around the reading position.

FIG. 12 is a diagram showing the data sorting portion 520. That is, it is a diagram showing the construction of the input side of the shading compensating portion 503 in FIG. 8 in the case in which a CIS is used. The image sensor 158 is a color sensor capable of reading RGB signals and is formed by connecting a row of chips 1 through 16 in the main scanning direction. Analog image signals output from the chips 1 through 6 are input to an analog processor AP1 of an A/D converting portion 301. The analog processor AP1 is of 6 ch input, and effects A/D conversion through time division to output 10-bit digital signals. Similarly, analog image signals output from the chips 7 through 12 are input to an analog processor AP2 of the A/D converting portion 301. The analog processor AP2 is of 6 ch input, and effects A/D conversion through time division to output 10-bit digital signals.

Similarly, analog image signals output from the chips 13 through 16 are input to an analog processor AP3 of the A/D converting portion 301. The analog processor AP3 is of 6 ch input and effects 4 ch input, performing A/D conversion through time division to output 10-bit digital signals. From the A/D converting portion 301, 10-bit digital signals are 3-ch output. They are input to the subsequent, sorting portion 520. The input signals consist of a plurality of RGB chip signals arranged in a complicated fashion, so that they cannot form a natural image as they are. The sorting portion 520 effects sorting, and divides them into RGB digital signals, outputting the signals to the shading compensating portion 503.

The sorting portion is constructed as follows. It is composed of two memory groups of EVEN and ODD, each consisting of nine memories. When data is being written to EVEN, data is read from ODD, and when data is being written to ODD, data is read from EVEN, thus adopting the construction of a so-called toggle buffer memory. In a certain line, data is written to EVEN memory group; of the signals output from the analog processor AP1, R-signal is written to ER1, G-signal is written to EG1, and B-signal is written to EB1. Of the signals output from the analog processor AP2, R-signal is written to ER2, G-signal is written to EG2, and B-signal is written to EB2. Of the signals output from the analog processor AP3, R-signal is written to ER3, G-signal is written to EG3, and B-signal is written to EB3. At the same time, reading is effected from the ODD memory group; regarding R-signals, OR1 is read, and then OR2 is read, and then OR3 is read, with the result that there are read R-signals systematically arranged in the order of chips 1 through 16. This also applies to G and B.

In the next line, the EVEN memory group and the ODD memory group are interchanged with each other. By repeating interchange line by line, image output is effected in line sequence to be input to the shading compensating portion 503. Although not shown since it is a well-known device, the image sensor 158 formed by CIS is constructed so as to be in direct contact with the platen glass plate 161 and the original glass table 3. When an original on the platen glass plate 161 and the original glass table 3 is to be read, not the mirror stand but the CIS itself is moved in the sub scanning direction. In this way, in the case of a CIS, the image sensor 158 is composed of a multitude of chips, so that it is necessary to provide the sorting portion 520. However, the process from the shading compensating portion 520 onward can be regarded as completely the same, so that, the operation and effect of this embodiment are the same as those of the first embodiment.

In the above-described example, as the method of preparing correction data for effecting correction such that the white level at the first reading position is the same as that at the second reading position, reading operation is conducted in the duplex mode with the reference sheet set on the ADF since a change in reading position during original reading is not allowed. However, in the correction data preparing operation (=adjustment) in the above case, reading operation is effected once, and then the sheet is reversed before executing reading operation again, so that there is further room for improvement. That is, reading operation is conducted on the reference sheet in a circulation mode in which the first side of the reference sheet is read at the first reading position and in which the second side of the reference sheet is read at the second reading position, whereby one setting operation suffices for one sheet, thereby realizing a further improvement in terms of service processing.

Figure 17:
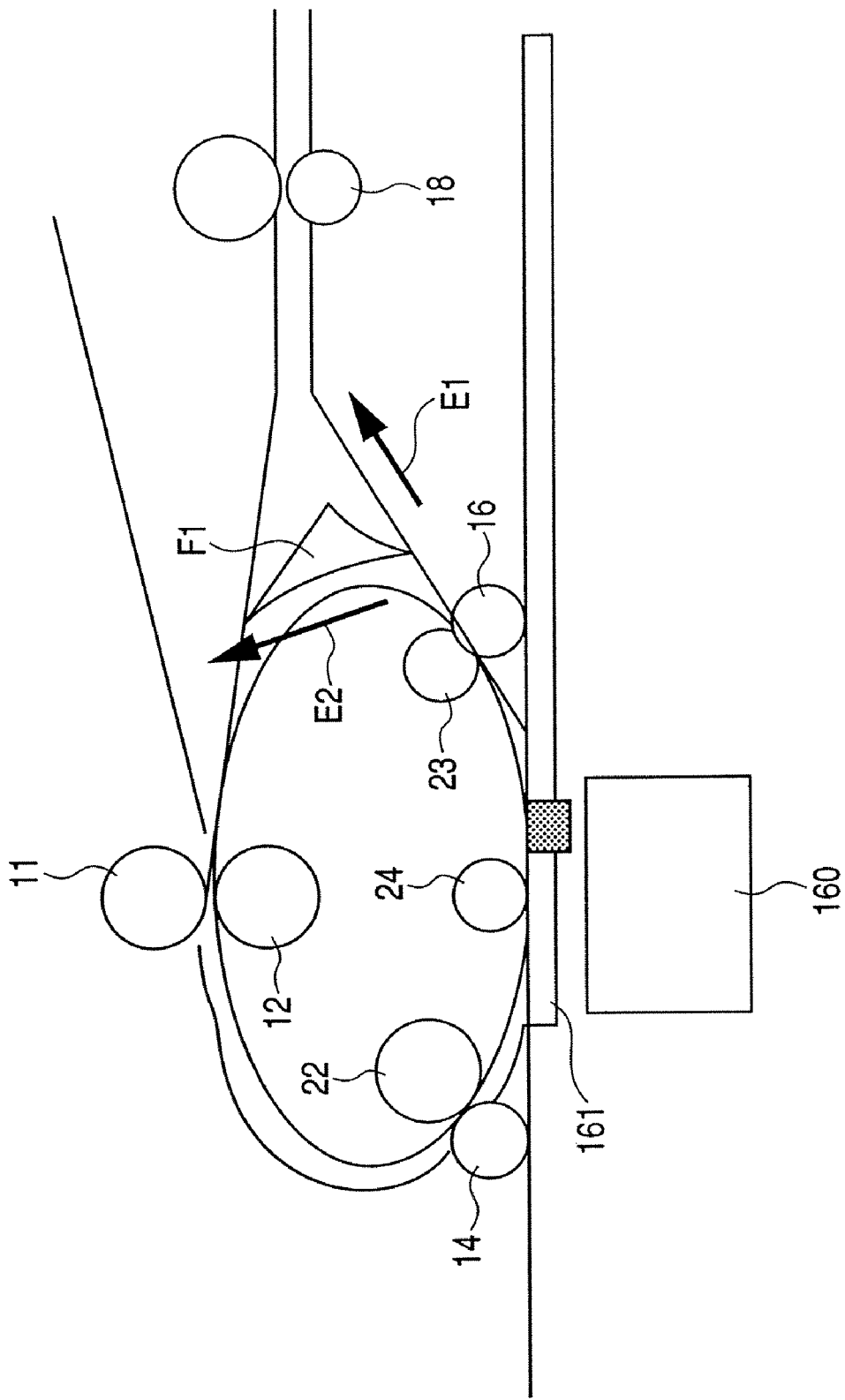
FIG. 17 is a diagram showing a third embodiment of the present invention.

In a third embodiment, operation is effected in a construction in which it is possible to perform reading operation on a reference sheet in a circulation mode. This construction will be described with reference to FIG. 17. In contrast to the above construction, there is provided a flapper F on the output side of the read discharge roller 23 and the driven read discharge roller 16. By controlling the flapper position, it is possible to determine whether the reference sheet transported is to be transported in the direction E1 or in the direction E2. By transporting the sheet in the direction E2 through this control of the flapper F1, a circulation mode is realized.

Figure 18:
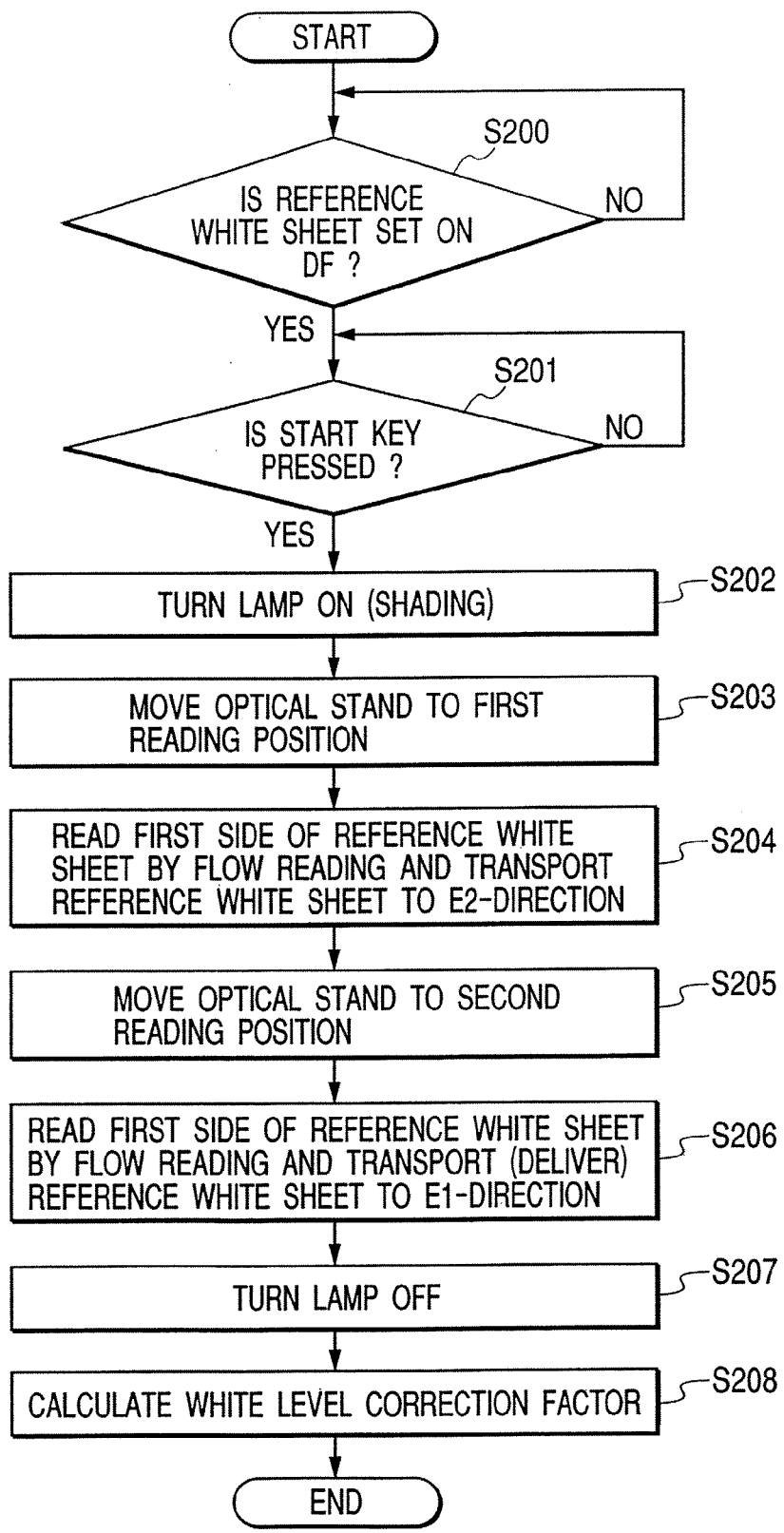
FIG. 18 is a flowchart illustrating a process in the third embodiment of the present invention.

Next, the operation of this embodiment will be illustrated with reference to the flowchart of FIG. 18. First, in S200, a correction data calculation chart (=reference white sheet) is set on the DF. This reference white sheet may be an SK sheet generally used in offices. When the reference white sheet is placed on the DF in S200, the first mirror stand 159 waits for depression of the start key in S201. When the start key is depressed in S201, the first mirror stand 159 effects shading compensation (inclusive of turning on of the lamp) at the home position (S202). After S202, the first mirror stand 159 moves to the first reading position 160 (S203). After S203, the first side of the reference white sheet is read through DF flow reading, and the flapper F1 is controlled so as to transport the reference white sheet in the direction E2 (S204). The process of reading the reference white sheet will be described later. After S204, the first mirror stand 159 moves to the second reading position 163 (S205). After S205, the first side of the reference white sheet is read, and the flapper F1 is controlled so as to transport the reference white sheet in the direction E1 to thereby effect delivery (S206). After S206, the lamp 152 is turned off, and the white level correction factor is calculated (S208).

Thus, as compared with the duplex mode, the requisite time for the correction data preparing operation is shorter, and, since only one side of the reference sheet is used, the handling of the sheet as a service part is facilitated. That is, as compared with the duplex operation, the system in which reading is effected while circulating the original (circulation mode) can realize a reduction in time since it does not involve the original reversing operation as required in the duplex mode.

Further, as compared with the duplex operation, the handling of the sheet as a service part is easier since it is only necessary for one side of the sheet to satisfy the white level reference, thereby achieving a reduction in service parts cost. Further, it is also advantageous in that care has only to be taken of one side of the sheet. It goes without saying that, in the correction data preparing operation (=adjustment), it is possible to set the reference sheet two times (=2 job) on the ADF, that is, to execute reading operation on the reference sheet set on the ADF again after performing reading operation thereon once.

What is claimed is:

1. An image reading apparatus comprising:
    original transport means for transporting an original to a platen glass;
    image reading means for reading an image of the original in a first reading region in which the platen glass is in contact with the original as it is transported by the original transport means, or in a second reading region in which the platen glass and the original transported by the original transport means are not in contact with each other as the original is transported by the original transport means; and
    correction means for correcting image data read in the second reading region by the image reading means based on a ratio of a white level of the second reading region to that of the first reading region.

2. An image reading apparatus according to claim 1, further comprising:
    control means for performing control such that a reference sheet transported by said original transport means is read at the first reading region and the second reading region according to a predetermined reading mode,
    wherein said correction means prepares a white level correction value based on the ratio of second data read at the second reading region to first data read at the first reading region.

3. An image reading apparatus according to claim 2, wherein, in the predetermined reading mode, the reference sheet is read at the second reading region without being discharged after being read at the first region.

4. An image reading apparatus according to claim 3, wherein the predetermined reading mode is a duplex mode.

5. An image reading apparatus according to claim 3, wherein the predetermined reading mode is a circulation mode.

6. An image reading apparatus according to claim 2, wherein the first data and the second data are sampling data.

7. An image reading apparatus according to claim 6, wherein, as the sampling data, average data of peripheral n pixels is used with respect to m main-scanning pixels, and average data of p lines in a sub scanning direction is used with respect to o sub-scanning lines.

8. An image reading apparatus comprising:
original transporting means for transporting an original to a platen glass;
image reading means for reading an image of the original in a first reading region in which the platen glass is in contact with the original transported by the original transporting means or a second reading region in which the platen glass and the original transported by the original transporting means are not in contact with each other while the original is transported on the platen glass by the original transporting means; and
correction means for correcting image data read in the second reading region by the image reading means so as to give the image data a same white level as image data read in the first reading region based on a ratio of a white level of the second reading region to that of the first reading region.

9. An image reading apparatus according to claim 8, further comprising:
control means for performing control such that a reference sheet transported by the original transporting means is read at the first reading region and the second reading region according to a predetermined reading mode,
wherein the correction means prepares a white level correction value based on a ratio of second data read at the second reading region to first data read at the first reading region.

10. An image reading apparatus according to claim 9, wherein, in the predetermined reading mode, the reference sheet is read at the second reading region without being discharged after being read at the first reading region.

11. An image reading apparatus according to claim 10, wherein the predetermined reading mode is a duplex mode.

12. An image reading apparatus according to claim 10, wherein the predetermined reading mode is a circulation mode.

13. An image reading apparatus according to claim 9, wherein the first data and the second data are sampling data.

14. An image reading apparatus according to claim 13, wherein, as the sampling data, average data of peripheral n pixels is used with respect to m main-scanning pixels, and average data of p lines in a sub-scanning direction is used with respect to o sub-scanning lines.

* * * * *